United States Patent
Danziger

(10) Patent No.: US 12,352,974 B2
(45) Date of Patent: Jul. 8, 2025

(54) OPTICAL SYSTEM FOR DIRECTING AN IMAGE FOR VIEWING

(71) Applicant: Lumus Ltd., Ness Ziona (IL)

(72) Inventor: Yochay Danziger, Kfar Vradim (IL)

(73) Assignee: Lumus Ltd., Ness Ziona (IL)

( * ) Notice: Subject to any disclaimer, the term of this patent is extended or adjusted under 35 U.S.C. 154(b) by 446 days.

(21) Appl. No.: 18/094,362

(22) Filed: Jan. 8, 2023

(65) Prior Publication Data

US 2023/0221561 A1 Jul. 13, 2023

Related U.S. Application Data

(63) Continuation-in-part of application No. PCT/IL2022/050216, filed on Feb. 24, 2022.

(60) Provisional application No. 63/430,036, filed on Dec. 4, 2022, provisional application No. 63/424,923, filed on Nov. 13, 2022, provisional application No. 63/421,769, filed on Nov. 2, 2022, provisional application No. 63/324,218, filed on Mar. 28, 2022, provisional application No. 63/297,299, filed on Jan. 7, 2022.

(51) Int. Cl.
*G02B 27/01* (2006.01)
*F21V 8/00* (2006.01)

(52) U.S. Cl.
CPC ....... *G02B 27/0172* (2013.01); *G02B 6/0035* (2013.01); *G02B 6/005* (2013.01); *G02B 2027/0178* (2013.01)

(58) Field of Classification Search
CPC .. G02B 27/0172; G02B 6/0035; G02B 6/005; G02B 2027/0178; G02B 6/0011; G02B 2027/0174; G02B 27/0081; G02B 2027/0125

See application file for complete search history.

(56) References Cited

U.S. PATENT DOCUMENTS

| | | | |
|---|---|---|---|
| 5,076,664 A * | 12/1991 | Migozzi | G09B 9/326 359/630 |
| 6,829,095 B2 | 12/2004 | Amitai | |
| 8,004,765 B2 | 8/2011 | Amitai | |
| 10,884,173 B2 | 1/2021 | Danziger et al. | |
| 11,561,335 B2 | 1/2023 | Danziger et al. | |
| 11,630,260 B2 | 4/2023 | Grabarnik et al. | |
| 11,644,676 B2 | 5/2023 | Grabarnik et al. | |
| 11,796,729 B2 | 10/2023 | Eisenfeld et al. | |
| 11,860,369 B2 | 1/2024 | Chriki et al. | |
| 11,886,008 B2 | 1/2024 | Chriki et al. | |
| 12,124,037 B2 | 10/2024 | Eisenfeld | |
| 12,152,994 B2 | 11/2024 | Ronen et al. | |

(Continued)

*Primary Examiner* — Collin X Beatty
(74) *Attorney, Agent, or Firm* — Rivka Friedman

(57) ABSTRACT

An optical system includes a partial-internal-reflection rectangular light guide (PRLG) (10) having three surfaces supporting internal reflection and a partially-reflecting fourth surface (34) with which a second light guide portion (30) is associated. A light beam redirecting arrangement, typically including a set of embedded partially-reflecting surfaces (12), in light guide portion (30) redirects light emerging from the PRLG towards a third light guide portion (20) that includes a coupling-out configuration (122), such as a further set of partially-reflecting surfaces (28), coupling-out light beams of an image towards the eye of a user.

18 Claims, 23 Drawing Sheets

(56) References Cited

U.S. PATENT DOCUMENTS

| | | | |
|---|---|---|---|
| 2007/0159673 A1* | 7/2007 | Freeman | G02B 6/0028 |
| | | | 359/19 |
| 2008/0094586 A1* | 4/2008 | Hirayama | G02B 27/0172 |
| | | | 353/98 |
| 2009/0015929 A1 | 1/2009 | DeJong et al. | |
| 2014/0160577 A1 | 6/2014 | Dominici et al. | |
| 2017/0045666 A1* | 2/2017 | Vasylyev | G02B 6/0068 |
| 2018/0059305 A1* | 3/2018 | Popovich | G02B 27/0103 |
| 2018/0210202 A1 | 7/2018 | Danziger | |
| 2019/0064518 A1* | 2/2019 | Danziger | G02B 27/0081 |
| 2020/0209667 A1 | 7/2020 | Sharlin et al. | |
| 2022/0269098 A1 | 8/2022 | Danziger et al. | |
| 2022/0390748 A1 | 12/2022 | Danziger et al. | |
| 2022/0397766 A1 | 12/2022 | Chriki et al. | |
| 2023/0051619 A1 | 2/2023 | Eisenfeld et al. | |
| 2023/0251488 A1 | 8/2023 | Ronen et al. | |
| 2023/0266593 A1 | 8/2023 | Eisenfeld | |
| 2023/0314689 A1 | 10/2023 | Chriki et al. | |
| 2023/0359034 A1 | 11/2023 | Ronen | |
| 2024/0176146 A1 | 5/2024 | Chriki et al. | |
| 2024/0231099 A1 | 7/2024 | Danziger et al. | |
| 2024/0337844 A1 | 10/2024 | Danziger et al. | |
| 2024/0411137 A1 | 12/2024 | Eisenfeld et al. | |

\* cited by examiner

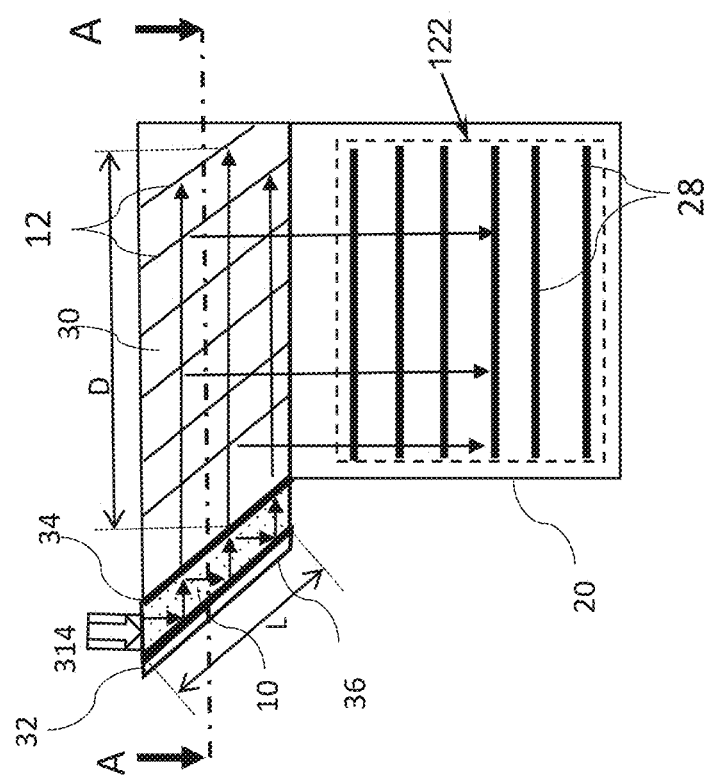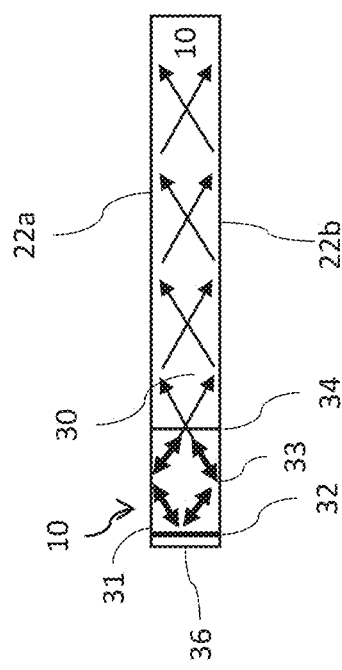
FIG. 2A
FIG. 2B

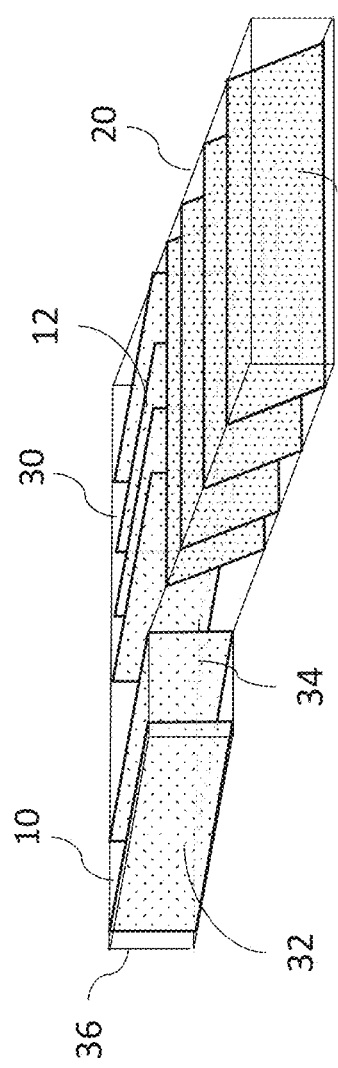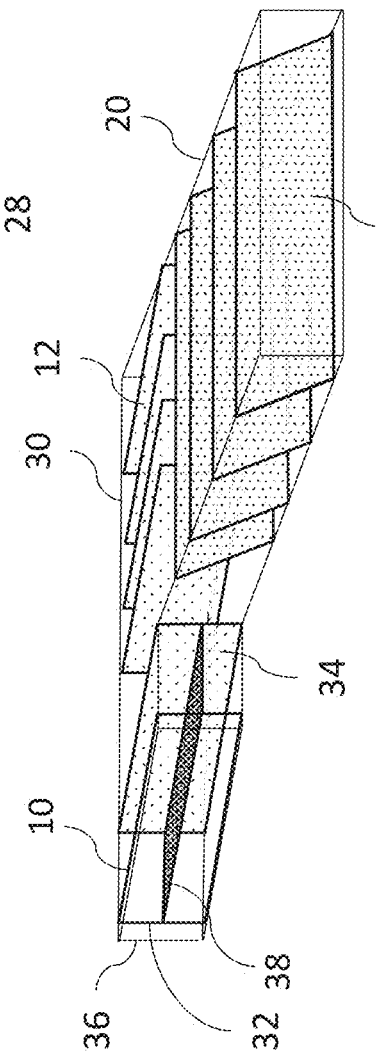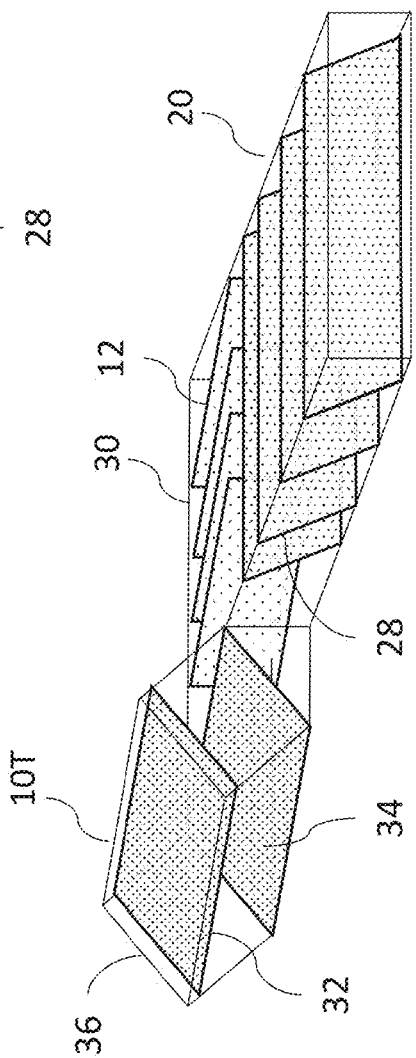

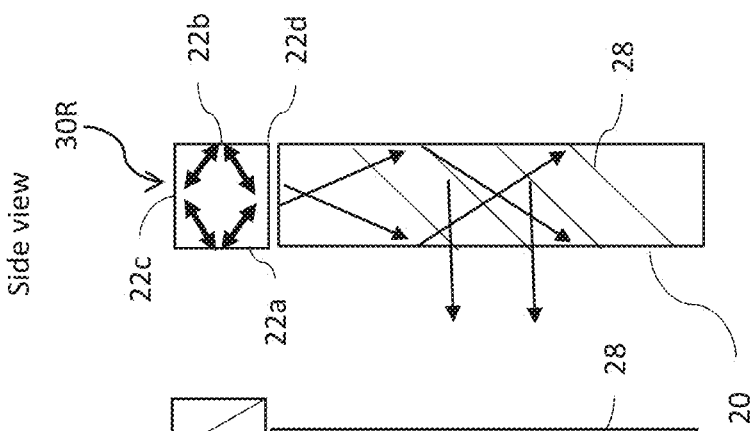
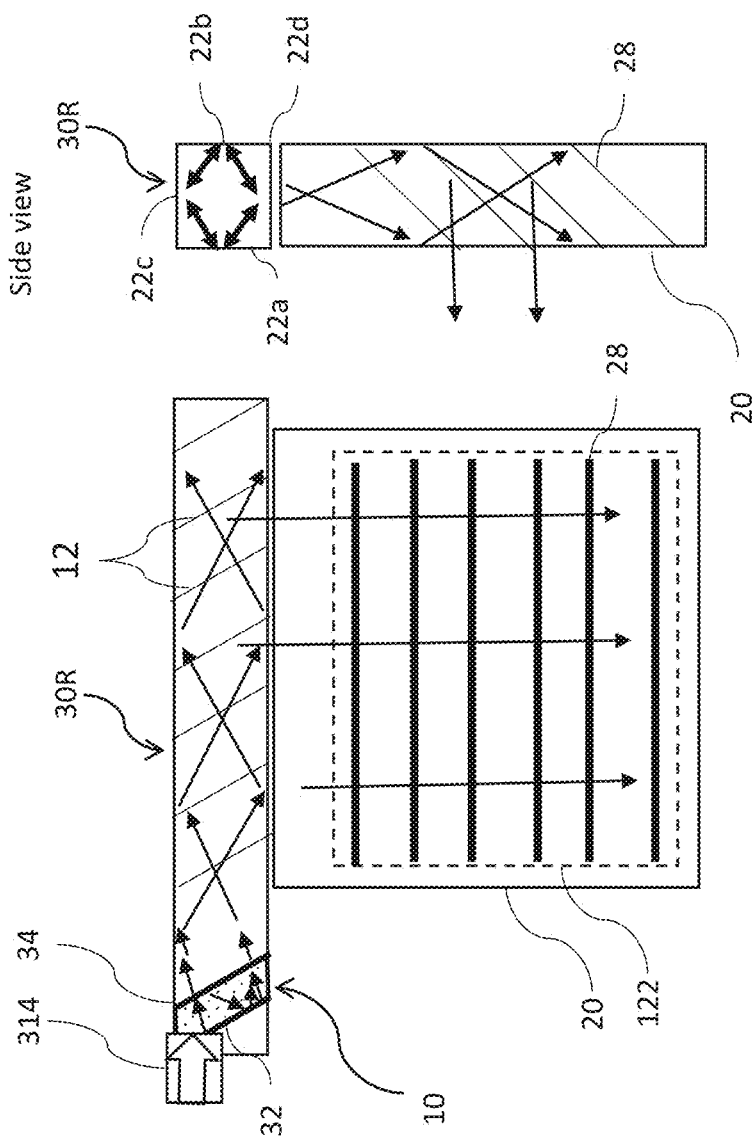

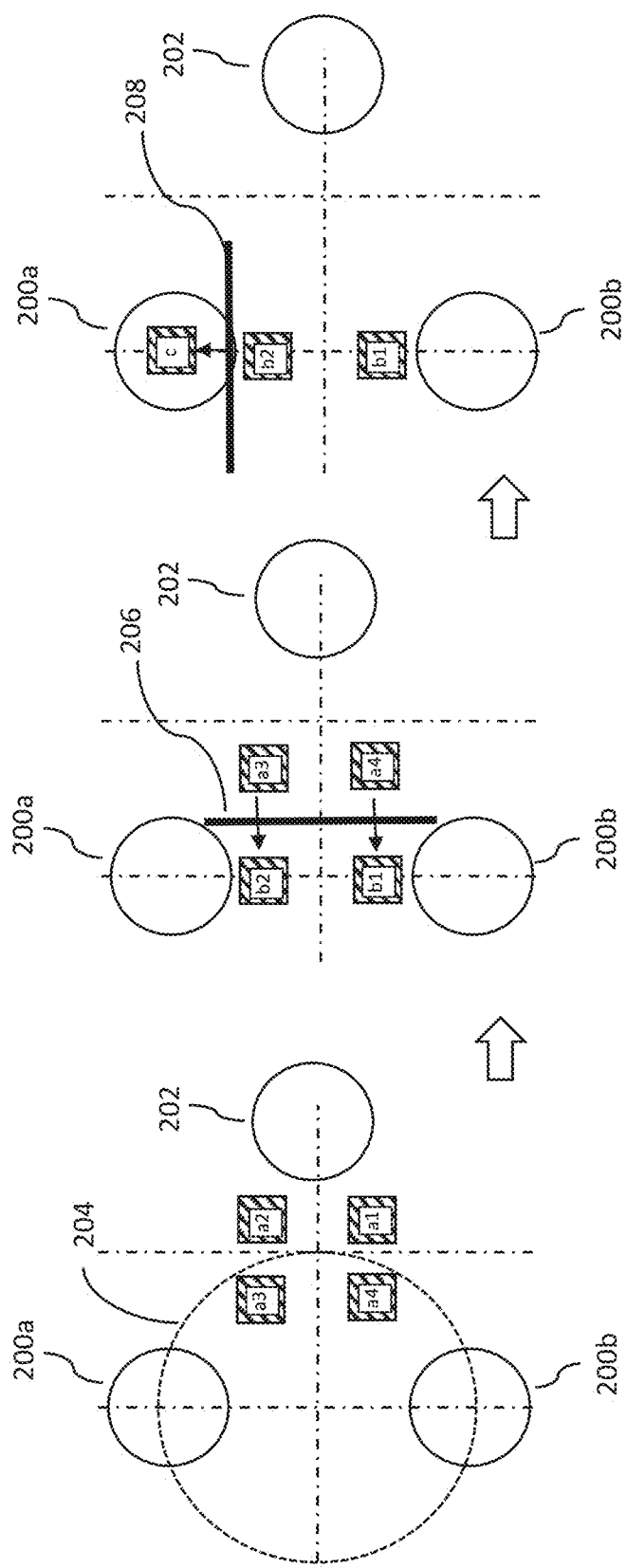

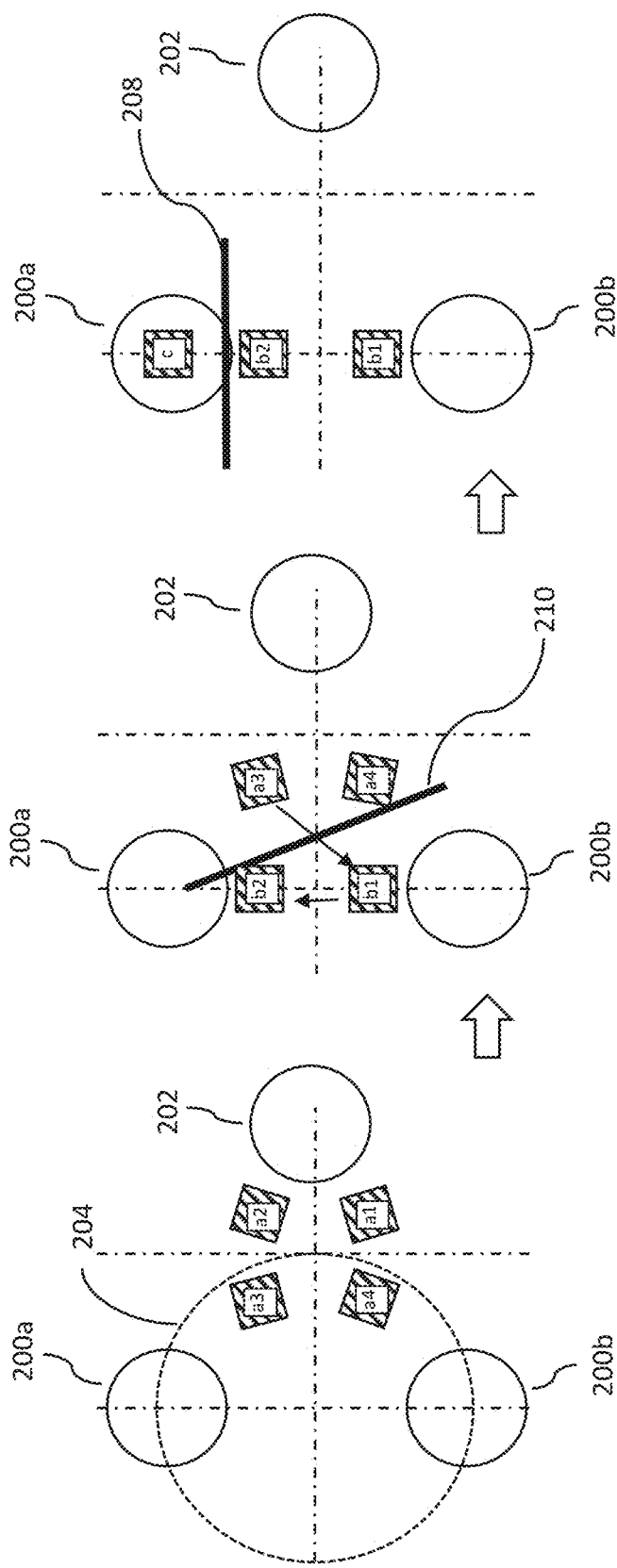

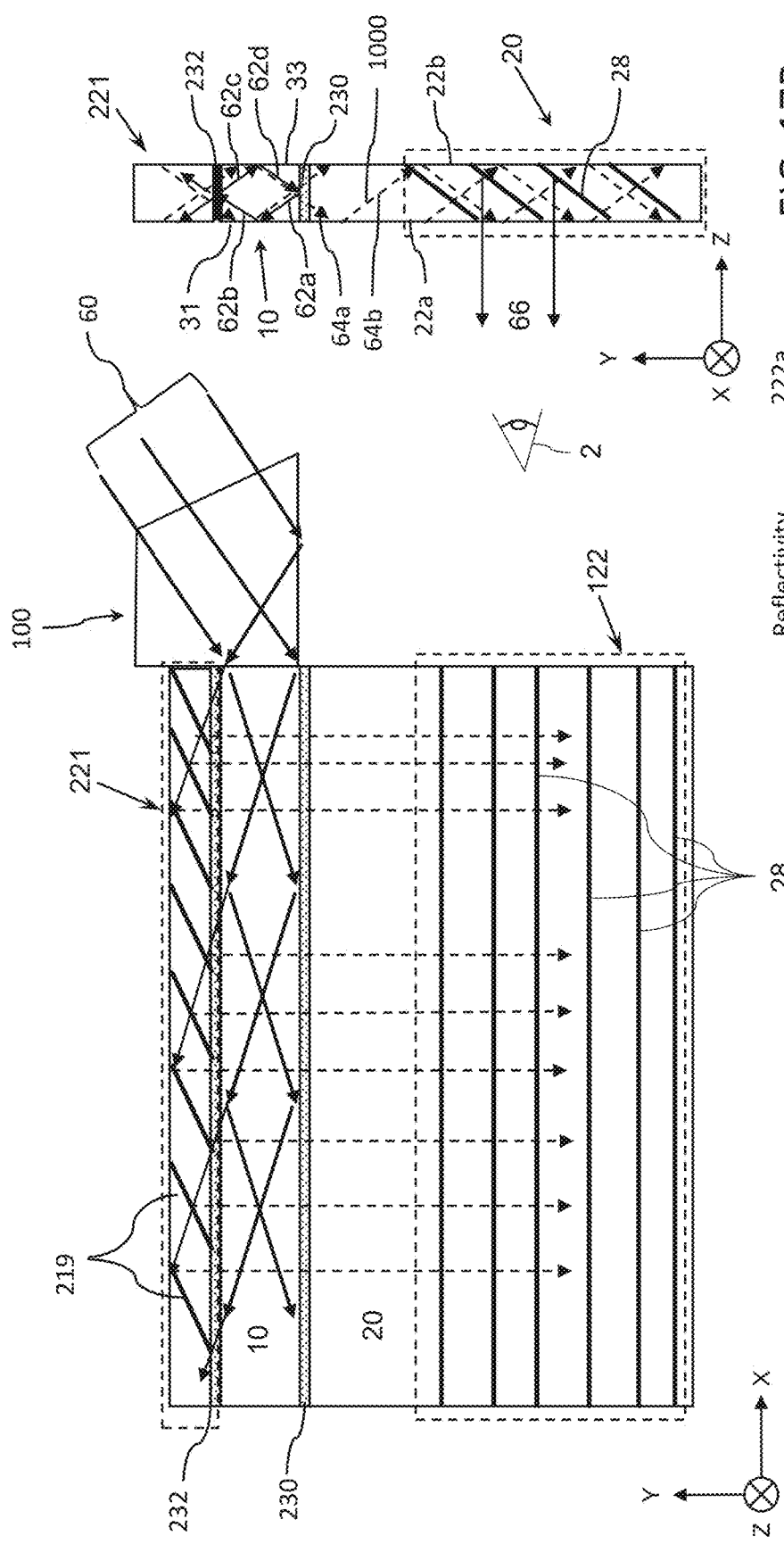
FIG. 17A
FIG. 17B
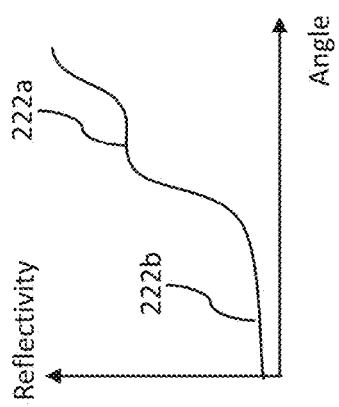
FIG. 17C

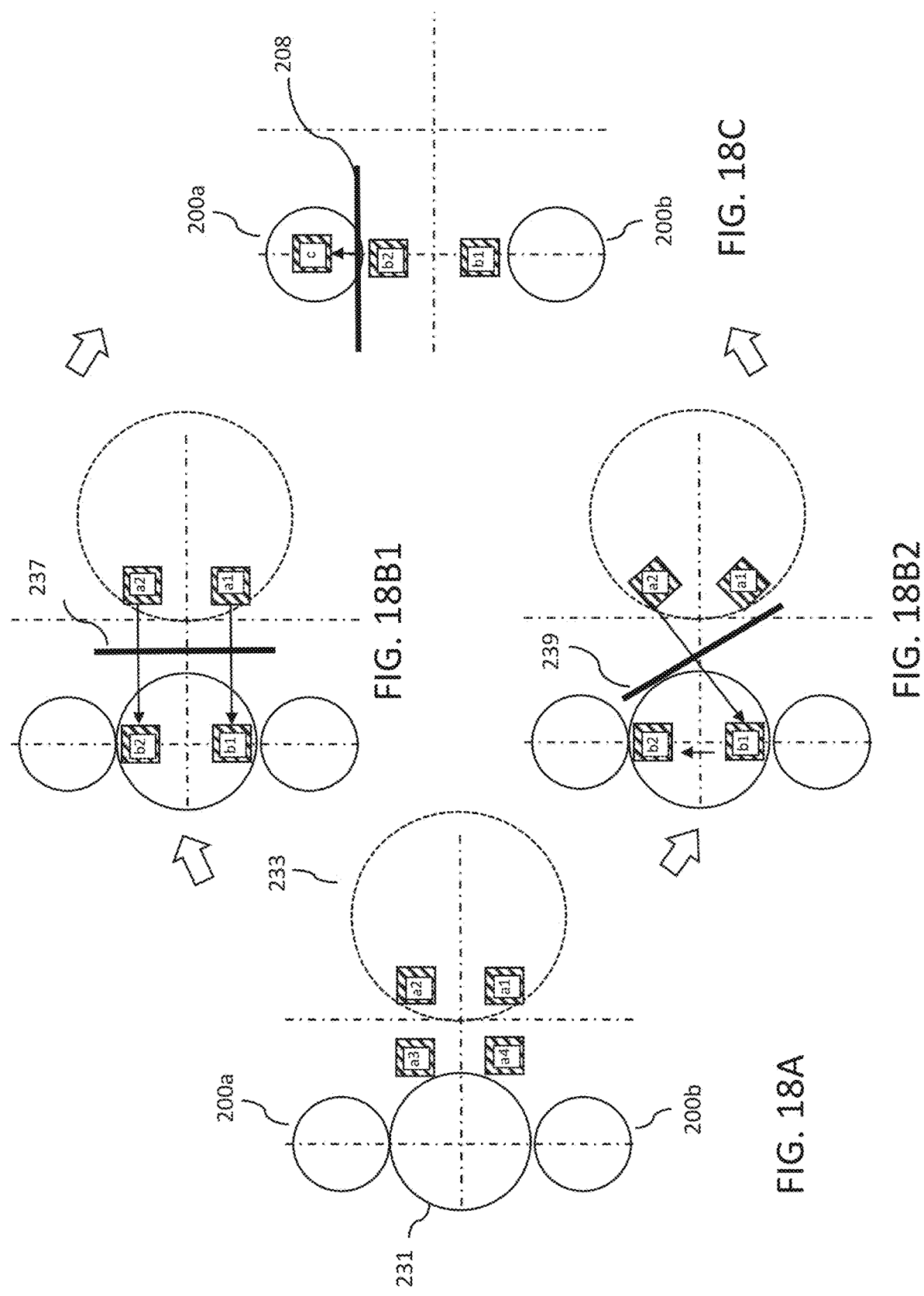

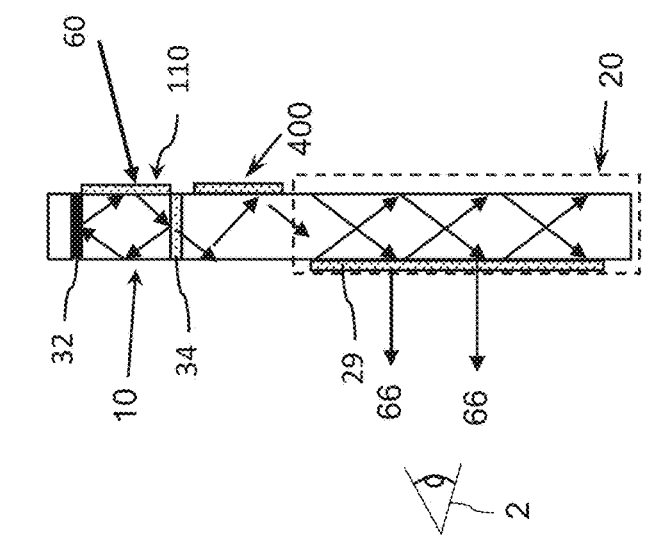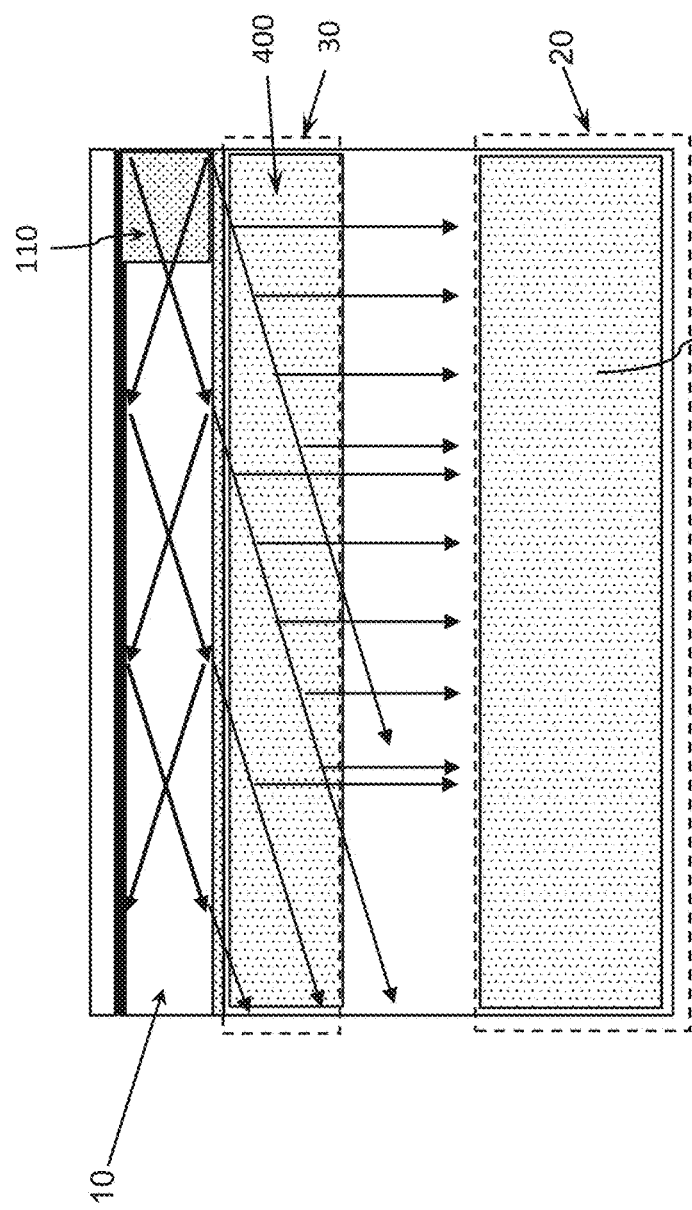

OPTICAL SYSTEM FOR DIRECTING AN IMAGE FOR VIEWING

FIELD AND BACKGROUND OF THE INVENTION

The present invention relates to optical systems and, in particular, it concerns an optical system for directing light beams corresponding to an image from an image projector towards a user for viewing.

Many near-eye display systems include a transparent light guide (LG) or "waveguide" placed before the eye of the user, which conveys an image by internal reflection and then couples out the image by a suitable coupling-out configuration towards the eye of the user. The coupling-out configuration may be based on embedded partial reflectors or "facets", or may employ a diffractive pattern. In both cases, the coupling-out configuration progressively couples-out the light beams making up the image, thereby achieving expansion of the optical aperture in one direction.

In order to allow the use of a miniature image projector, some near-eye display systems provide two-dimensional expansion of the optical aperture from the image projector. One subset of such solutions is described in U.S. Pat. No. 10,133,070 in which the first dimension of aperture expansion is achieved using a rectangular cross-section waveguide with embedded partial reflectors.

SUMMARY OF THE INVENTION

The present invention is an optical system for directing light beams corresponding to an image from an image projector towards a user for viewing.

According to the teachings of an embodiment of the present invention there is provided, an optical system for directing light beams corresponding to an image from an image projector towards a user for viewing, the optical system comprising: (a) a partial-internal-reflection rectangular light guide (PRLG) formed from a transparent material and having first and second mutually-parallel major surfaces, a third major surface perpendicular to the first and second major surfaces, the first, second and third major surfaces supporting internal reflection for a range of incident angles, and a fourth major surface parallel to the third major surface, at least part of the fourth major surface provided with a non-diffractive, partially-reflecting coating; (b) a second light guide portion having a pair of mutually-parallel major surfaces for conveying the light beams by internal reflection, the second light guide portion optically coupled to at least part of an area of the partially-reflecting coating, the second light guide portion containing a set of planar, mutually-parallel, partially-reflecting surfaces located between, and non-parallel to, the pair of major surfaces; (c) a third light guide portion, formed as a continuation of, or adjacent to, the second light guide portion, the third light guide portion including a coupling-out configuration deployed for coupling-out the light beams propagating within the third light guide portion by internal reflection so as to direct the light beams towards the user; and (d) a coupling-in arrangement for coupling light beams corresponding to a collimated image from the image projector into the PRLG so as to propagate within the PRLG by four-fold internal reflection at the first, second, third and fourth major surfaces, such that the light beams from the image projector propagating by four-fold internal reflection within the PRLG are progressively emitted from the PRLG through the partially-reflecting coating and enter the second light guide portion, are redirected by reflection at the set of partially-reflecting surfaces so as to propagate within the third light guide portion, and are coupled-out from the third light guide portion by the coupling-out configuration towards the user.

According to a further feature of an embodiment of the present invention, the PRLG has a length along a direction parallel to a line of intersection between the first major surface and the third major surface, and wherein a maximum length of a light path of the light beams from being emitted from the PRLG until being redirected by one of the set of partially-reflecting surfaces is longer than the length of the PRLG.

According to a further feature of an embodiment of the present invention, the PRLG has a length along a direction parallel to a line of intersection between the first major surface and the third major surface, and wherein a maximum length of a light path of the light beams from being emitted from the PRLG until being redirected by one of the set of partially-reflecting surfaces is shorter than the length of the PRLG.

According to a further feature of an embodiment of the present invention, the second light guide portion has a second pair of mutually-parallel major surfaces, perpendicular to the pair of mutually-parallel major surfaces, so that the second light guide portion conveys the light beams by four-fold internal reflection, the set of partially-reflecting surfaces coupling the light beams out from the second light guide portion and into the third light guide portion.

According to a further feature of an embodiment of the present invention, the first and second major surfaces of the PRLG are parallel to, or coplanar with, the pair of mutually-parallel major surfaces of the second light guide portion.

According to a further feature of an embodiment of the present invention, the second light guide portion and the third light guide portion are portions of a single light guide such that the pair of mutually-parallel major surfaces extend continuously across the second and third light guide portions.

According to a further feature of an embodiment of the present invention, the coupling-out configuration comprises a second set of mutually-parallel partially-reflecting internal surfaces deployed within the third light guide portion.

According to a further feature of an embodiment of the present invention, the coupling-out configuration comprises a diffractive optical element associated with the third light guide portion.

According to a further feature of an embodiment of the present invention, the PRLG is without internal reflectors.

According to a further feature of an embodiment of the present invention, a majority of a length of the PRLG is free from internal reflectors.

According to a further feature of an embodiment of the present invention, the PRLG includes at least one partially-reflecting internal surface, parallel to the set of partially-reflecting surfaces of the second light guide portion.

According to a further feature of an embodiment of the present invention, the at least one partially-reflecting internal surface includes a surface having a reflectivity for at least one range of incident angles that is greater than 10%, the surface being located in a third of a length of the PRLG distal to the coupling-in arrangement.

According to a further feature of an embodiment of the present invention, the at least one partially-reflecting internal surface includes a surface having a reflectivity for at least one range of incident angles that is less than 10%, the surface being located in a third of a length of the PRLG proximal to the coupling-in arrangement.

According to a further feature of an embodiment of the present invention, the third major surface of the PRLG is coated with a reflective coating to support reflection at incident angles below a critical angle of the transparent material in air.

There is also provided according to the teachings of an embodiment of the present invention, an optical system for directing light beams corresponding to an image from an image projector towards a user for viewing, the optical system comprising: (a) a partial-internal-reflection rectangular light guide (PRLG) formed from a transparent material and having first and second mutually-parallel major surfaces, a third major surface perpendicular to the first and second major surfaces, the first, second and third major surfaces supporting internal reflection for a range of incident angles, and a fourth major surface parallel to the third major surface, at least part of the fourth major surface provided with a non-diffractive, partially-reflecting coating; (b) a second light guide portion having a pair of mutually-parallel major surfaces for conveying the light beams by internal reflection, the second light guide portion optically coupled to at least part of an area of the partially-reflecting coating, the second light guide portion being provided with a diffractive optical element deployed to deflect light beams propagating within the second light guide portion; (c) a third light guide portion, formed as a continuation of, or adjacent to, the second light guide portion, the third light guide portion including a coupling-out configuration deployed for coupling-out the light beams propagating within the third light guide portion by internal reflection so as to direct the light beams towards the user; and (d) a coupling-in arrangement for coupling light beams corresponding to a collimated image from the image projector into the PRLG so as to propagate within the PRLG by four-fold internal reflection at the first, second, third and fourth major surfaces, such that the light beams from the image projector propagating by four-fold internal reflection within the PRLG are progressively emitted from the PRLG through the partially-reflecting coating and enter the second light guide portion, are redirected by the diffractive optical element so as to propagate within the third light guide portion, and are coupled-out from the third light guide portion by the coupling-out configuration towards the user.

There is also provided according to the teachings of an embodiment of the present invention, an optical system for directing light beams corresponding to an image from an image projector towards a user for viewing, the optical system comprising: (a) a partial-internal-reflection rectangular light-guide (PRLG) formed from a transparent material and having first and second mutually-parallel major surfaces and a third major surface perpendicular to the first and second major surfaces, the first, second and third major surfaces supporting internal reflection for incident angles above a critical angle, at least the third major surface being transmissive for incident angles smaller than the critical angle, and a fourth major surface parallel to the third major surface, at least part of the fourth major surface provided with a partially-reflecting coating that is partially reflecting for angles of incidence greater than the critical angle and transparent for the incident angles smaller than the critical angle; (b) a second light guide having a pair of mutually-parallel major surfaces for conveying the light beams by internal reflection, the second light guide optically coupled to at least part of an area of the partially-reflecting coating of the fourth major surface, the second light guide containing a set of planar, mutually-parallel, partially-reflecting surfaces located between, and non-parallel to, the pair of major surfaces; (c) a third light guide adjacent to the third major surface, the third light guide including a coupling-out configuration deployed for coupling-out the light beams propagating within the third light guide by internal reflection so as to direct the light beams towards the user; and (d) a coupling-in arrangement for coupling light beams corresponding to a collimated image from the image projector into the PRLG so as to propagate within the PRLG by four-fold internal reflection at the first, second, third and fourth major surfaces, such that the light beams from the image projector propagating by four-fold internal reflection within the PRLG are incident on the fourth major surface at incident angles greater than the critical angle, are progressively emitted from the PRLG through the partially-reflecting coating and enter the second light guide, are redirected by reflection at the set of partially-reflecting surfaces so as to be incident on the fourth major surface at incident angles less than the critical angle, traverse the PRLG and pass through the third major surface to enter the third light guide, propagating within the third light guide by internal reflection and being coupled-out from the third light guide by the coupling-out configuration towards the user.

According to a further feature of an embodiment of the present invention, the pair of major surfaces of the second light guide are perpendicular to the fourth major surface of the PRLG.

According to a further feature of an embodiment of the present invention, the second light guide further comprises an additional major surface parallel to the fourth major surface, the additional major surface supporting internal reflection of the light beams at incident angles greater than the critical angle.

BRIEF DESCRIPTION OF THE DRAWINGS

The invention is herein described, by way of example only, with reference to the accompanying drawings, wherein:

FIG. 2A is a schematic front view of a first embodiment of the optical system of FIG. 1;

FIG. 2B is a cross-sectional view taken along line A-A in FIG. 2A;

FIG. 5 is a schematic isometric view of the optical system of FIG. 2A;

FIG. 6 is a view similar to FIG. 5 illustrating incorporation of an internal beam-splitter within the PRLG;

FIG. 7 is a view similar to FIG. 5 illustrating an implementation in which the PRLG is inclined relative to other light guide portions of the optical system;

FIGS. 8A and 8B are views similar to FIGS. 2A and 2B, respectively, illustrating a variant embodiment in which a second light guide portion of the optical system is implemented as a rectangular light guide;

FIGS. 11A-11C are schematic representations in angular notation for the various stages of propagation of collimated images through the optical system of FIGS. 9A and 9B, for a case in which a set of partially-reflecting surfaces in a second light guide portion are orthogonal to major surfaces of the light guide;

FIGS. 12A-12C are schematic representations in angular notation for the various stages of propagation of collimated images through the optical system of FIGS. 9A and 9B, for a case in which a set of partially-reflecting surfaces in a second light guide portion are obliquely oriented to major surfaces of the light guide;

FIGS. 17A and 17B are a front view and a side view, respectively, of a further alternative embodiment of the optical system of FIG. 1;

FIG. 17C is a schematic plot of reflectivity as a function of incident angle (relative to the normal to the surface) for a coating of a surface between a PRLG and a second light guide in the optical system of FIGS. 17A and 17B;

FIGS. 18A, 18B1, 18B2 and 18C are schematic representations in angular notation for the various stages of propagation of collimated images through the optical system of FIGS. 17A and 17B, with FIGS. 18B1 and 18B2 depicting, respectively, cases in which a set of partially-reflecting surfaces in a second light guide portion are orthogonal or obliquely inclined to major surfaces of the light guide;

FIGS. 27A and 27B are views similar to FIGS. 10A and 10B, respectively, illustrating a further embodiment in which partially-reflecting surfaces of the second light guide portion are replaced by a diffractive optical element.

DESCRIPTION OF THE PREFERRED EMBODIMENTS

The present invention is an optical system for directing light beams corresponding to an image from an image projector towards a user for viewing.

The principles and operation of optical systems according to the present invention may be better understood with reference to the drawings and the accompanying description.

Figure 1:
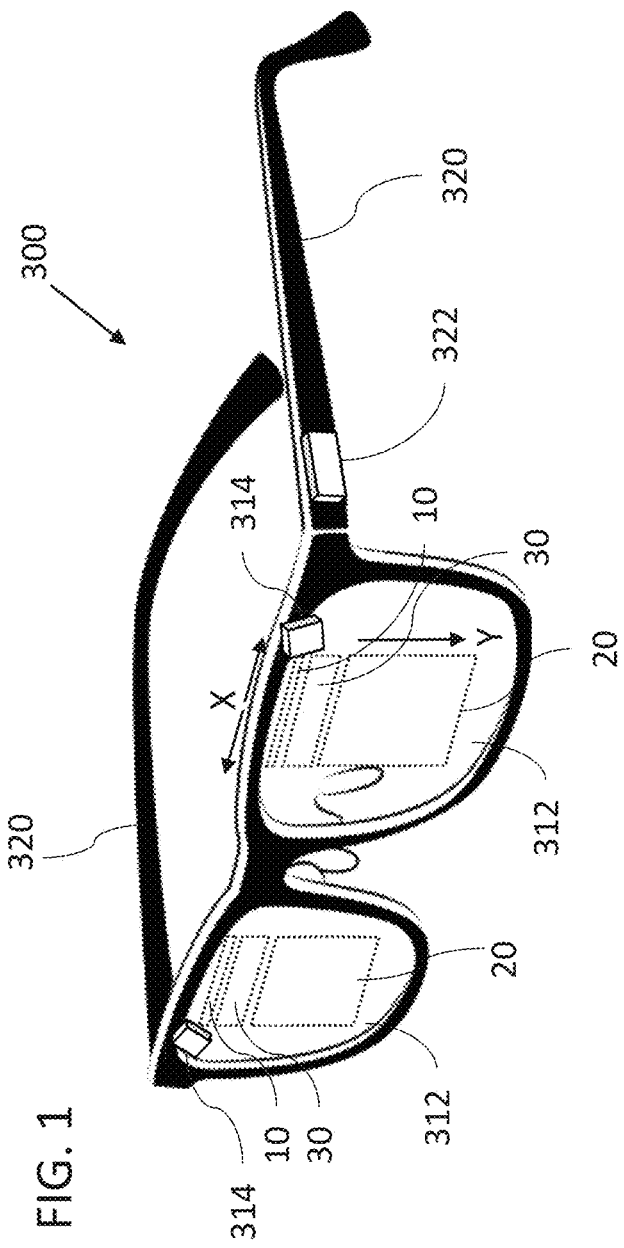
FIG. 1 is a schematic isometric view of a display device including an optical system, constructed and operative according to an embodiment of the present invention, that employs a partial-internal-reflection rectangular light guide (PRLG) for directing light beams corresponding to an image from an image projector towards a user for viewing.

By way of introduction, an aspect of the present invention provides an optical system for directing light beams corresponding to an image from an image projector towards a user for viewing which includes a partial-internal-reflection rectangular light guide (PRLG). FIG. 1 is a schematic overview of near-eye display 300 that employs two optical systems, each according to an embodiment of the present invention, to provide a binocular display to eyes of a user. In each optical system, a PRLG 10, a second light guide portion 30 and a third light guide portion 20 are shown, only schematically, as if combined in a common light-guide optical element 312 deployed in facing relation to each eye. In various implementations, PRLG 10 and possibly also second light guide portion 30 may in fact be incorporated into a housing that is outside the viewing area of the user's eye. Details of various implementations of these elements are discussed herein with reference to FIGS. 2A-26.

Conceptually, the PRLG is a rectangular light guide which, instead of relying on embedded facets for coupling-out of the image light beams, employs a partial reflector on one major surface of the light guide to allow gradual emission ("leakage") of the light beams as the light propagates along a length of the light guide. The direction of the emitted beams is a continuation of the internal beam path along which they were incident on the partially-reflecting major surface (subject to any refractive deflection due to differences in refractive indices of the materials, but without diffraction). A supplementary set of embedded partially-reflecting surfaces is provided in an adjacent light guide in order to redirect the emitted light so as to propagate within the light guide, or an adjacent light guide, towards a coupling-out arrangement, which directs the image light beams towards the user for viewing.

Thus, as seen in FIGS. 2A and 2B, the PRLG 10 is formed from a transparent material and has first and second mutually-parallel major surfaces 31 and 33, and a third major surface 32 perpendicular to the first and second major surfaces, where the first, second and third major surfaces support internal reflection for a range of incident angles, such as through total internal reflection (TIR) or through provision of reflective coatings. The rectangular cross-sectional shape is completed by a fourth major surface 34, parallel to the third major surface 32. At least part, and preferably all, of the fourth major surface 34 is provided with a non-diffractive, partially-reflecting coating. A second light guide portion 30, having a pair of mutually-parallel major surfaces 22a and 22b for conveying the light beams by internal reflection, is optically coupled to at least part, and preferably all, of an area of the partially-reflecting coating on fourth major surface 34 of PRLG 10. The second light guide portion 30 contains a set of planar, mutually-parallel, partially-reflecting surfaces 12 located between, and non-parallel to, the pair of major surfaces 22a and 22b. These embedded partially-reflecting surfaces are illustrated schematically in isometric view in FIGS. 5-7, below, and are represented elsewhere in the front views as lines. A third light guide portion 20, formed as a continuation of, or adjacent to, the second light guide portion 30, includes a coupling-out configuration deployed for coupling-out the light beams propagating within the third light guide portion by internal reflection so as to direct the light beams towards the user. A coupling-in arrangement couples light beams corresponding to a collimated image from an image projector 314 into the PRLG 10 so as to propagate within the PRLG by four-fold internal reflection at the first, second, third and fourth major surfaces.

As a result of this structure, the light beams from the image projector 314 propagating by four-fold internal reflection within the PRLG 10 are progressively emitted from the PRLG through the partially-reflecting coating and enter the second light guide portion 30, where they are redirected by reflection at the set of partially-reflecting surfaces 12 so as to propagate within the third light guide portion 20, and are then coupled-out from the third light guide portion by the coupling-out configuration towards the user.

This approach of employing a PRLG with one face that is partially reflective, combined with a set of partially reflecting surfaces in a light guide adjacent to the PRLG for redirecting the light beams of the image towards a coupling-out configuration provides significant advantages over conventional optical aperture expansion arrangements employing rectangular light guides. Referring for example to the designs disclosed in the aforementioned U.S. Pat. No. 10,133,070 ("the '070 patent"), the rectangular light guides described therein rely entirely on embedded partially-reflecting surfaces to couple-out the light beams of the image. A combination of demands, on one hand, for further miniaturization of the device and, on the other hand, for low-cost mass-production manufacturing processes, present challenges for such a design. The light guide of the '070 patent must be constructed by cutting and polishing a stack of thin plates coated with the partially-reflecting coatings, while minimizing scattering defects at the cut edges and maintaining highly precise parallelism of the partially-reflecting coatings and of the side faces of the rectangular light guide. In contrast, the PRLG may be largely or completely free from embedded facets, allowing it to be manufactured as a simple rectangular block of glass, either separately or by slicing the structure from a stack of bonded plates, as discussed further below, all of which can be done relatively cheaply to high precision. At the same time, the use of a set of partially reflecting surfaces external to the rectangular light guide for deflecting the light beams towards the coupling-out configuration frees the system from the geometrical limitations which would otherwise arise from the use of a PRLG. The PRLG and the set of partially-reflecting surfaces together achieve a first dimension of optical aperture expansion, while the coupling-out configuration achieves a second dimension of optical aperture expansion.

The coupling-out configuration as illustrated in most of the drawings is implemented as a second set of mutually-parallel partially-reflecting internal surfaces 28 deployed within third light guide portion 20, and inclined relative to the major surfaces of the third light guide portion, so as to redirect the light beams of the image out of the light guide towards the eye of the user. Alternative implementations, exemplified below with reference to FIGS. 10A and 10B, employ a coupling-out configuration implemented as a diffractive optical element associated with the third light guide portion.

The image projector 314 employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions. A representative direction of propagation is taken to be a central direction corresponding to a "chief ray" (central pixel) of the image.

Image projector 314 includes at least one light source, typically deployed to illuminate a spatial light modulator, such as a liquid crystal over silicon (LCOS) chip. The spatial light modulator modulates the projected intensity of each pixel of the image, thereby generating an image. Alternatively, the image projector may include a scanning arrangement, typically implemented using one or more fast-scanning mirror, which scans illumination from a laser light source across an image plane of the projector while the intensity of the beam is varied synchronously with the motion on a pixel-by-pixel basis, thereby projecting a desired intensity for each pixel. A further possibility is the use of an active light-generating image source, such as a micro-LED array. In all of the above cases, collimating optics are provided to generate an output projected image which is collimated to infinity. Some or all of the above components may be arranged on surfaces of one or more polarizing beam-splitter (PBS) cube or other prism arrangement, all as is known in the art.

Optical coupling of image projector 314 to PRLG 10 may be achieved by any suitable optical coupling, such as for example, via a coupling prism with an obliquely angled input surface, or via a reflective coupling arrangement, via a side edge and/or one of the major external surfaces of the LOE. Alternatively, a diffractive optical element (DOE) may be used for coupling the image into the substrate, in particular, where the coupling-out configuration is diffractive, in order to cancel out chromatic dispersion. Details of the coupling-in configuration are typically not critical to the invention, other than as specified in certain examples below, and are otherwise shown here only schematically.

It will be appreciated that the near-eye display 300 includes various additional components, typically including a controller 322 for actuating the image projector 314, typically employing electrical power from a small onboard battery (not shown) or some other suitable power source. Controller 322 includes all necessary electronic components such as at least one processor or processing circuitry to drive the image projector, all as is known in the art.

The display 300 is preferably supported relative to the head of a user with each LOE 312 facing a corresponding eye of the user. In one particularly preferred option as illustrated here, a support arrangement is implemented as an eye glasses frame with sides 320 for supporting the device relative to ears of the user. Other forms of support arrangement may also be used, including but not limited to, head bands, visors or devices suspended from helmets.

Turning now to specific but non-limiting exemplary implementations of the optical system of the present invention, a first group of implementations is illustrated in FIGS. 2A-8B, in which a maximum length of a light path D of the light beams from being emitted from PRLG 10 until being redirected by one of the set of partially-reflecting surfaces 12 is longer than a length L of PRLG 10 along a direction parallel to a line of intersection between first major surface 31 and third major surface 32. In this case, the PRLG 10 is shorter than the desired horizontal aperture expansion. (The terms "horizontal" and "vertical" throughout this document are used intuitively to refer to the orientation illustrated in the drawings, while understanding that the orientation of the entire structure may be chosen arbitrarily according to design considerations of the required form factor of the device.) The structure can therefore be considered to be three-stage aperture expansion. The first stage is PRLG 10. The light beams from the image projector 314 are coupled into PRLG 10 as fourfold reflections from first and second major surfaces 31 and 33, third major surface 32 and partially-reflecting fourth major surface 34. As the light beams propagate along PRLG 10, part of the light intensity of two of the reflected beams passes through surface 34, "leaking out" into second light guide portion 30 as shown in the cross-section A-A, while the remainder of the light continues to propagate along PRLG 10. This results in vertical aperture expansion so that the input into second light guide portion 30 is significantly wider than the output aperture of image projector 314. As the light beams propagate along second light guide portion 30 by two-fold internal reflection, they are progressively partially reflected by partially-reflecting surfaces 12, which redirects them to propagate downwards as shown while expanding the effective aperture of the beams in a horizontal direction. The light beams then propagate downwards, passing from second light guide portion 30 into third light guide portion 20. The light beams are then progressively coupled out by coupling-out configuration 122, implemented as a set of mutually-parallel, partially-reflecting surfaces 28, which progressively deflect the light beams out of the light guide towards the eye of the user (not shown).

PRLG 10 is preferably narrow, facilitating the use of a highly compact image projector 314 with a small output optical aperture.

In the preferred implementation illustrated here, first and second major surfaces 31 and 33 of PRLG 10 are coplanar with the external parallel faces 22a and 22b of second light guide portion 30, while third and fourth major surfaces 32 and 34 are perpendicular thereto. Preferably, for ease of production, surfaces 32 and 34 are also implemented to be parallel to embedded partially-reflecting surfaces 12. This allows surfaces 32 and 34 to be produced as coated plates and stacked with additional coated plates for forming surfaces 12, followed by slicing and polishing of the stack, so that a single manufacturing process can be used to form PRLG 10 and second light guide portion 30 simultaneously.

Preferably the light injected into PRLG 10 is S-polarized relative to fourth surface 34, thereby matching the preferred polarization for facets 12 and maintaining polarization orientation along light guide portion 30.

A protective cover 36 may advantageously be provided over surface 32 in order to protect the structural integrity of surface 32. Protective cover 36 may be a low-index material to preserve total internal reflection (TIR) conditions for surface 32. Alternatively, reflectivity of surface 32 may be provided by a reflective coating, such as a metallic coating, thereby making the device insensitive to the refractive index of the protective cover.

The partial reflectivity of fourth major surface 34 may be provided by a metallic coating, making it relatively insensitive to incident angle. Alternatively, the angular reflectivity of fourth major surface 34 can be set to have different aperture expansion for different angularly distributed beams by having its reflectivity dependent on angle of incidence of the beam. Angular transmittance (complimentary to reflectivity) is optimized considering two opposing parameters depending on required transmittance location along the PRLG to reach the viewing location (eye motion box). High transmittance enables efficient output coupling at the desired location, but can also cause too much light to couple out before the required location. Maximal total efficiency is achieved by optimizing these two considerations. Preferably, this optimization is performed to the farthest point along the PRLG where lowest power exists. Angularly-dependent reflectivity with a given desired dependence can be achieved using multi-layer dielectric coatings with layer thicknesses designed using standard software tools, all as is known in the art.

Although illustrated here in an implementation where surfaces 32 and 34 are parallel to partially-reflecting surfaces 12, PRLG 10 may be produced separately from second light guide portion 30, in which case it may have a different orientation than the surfaces 12 (as illustrated below with reference to FIG. 24B).

Figure 3:
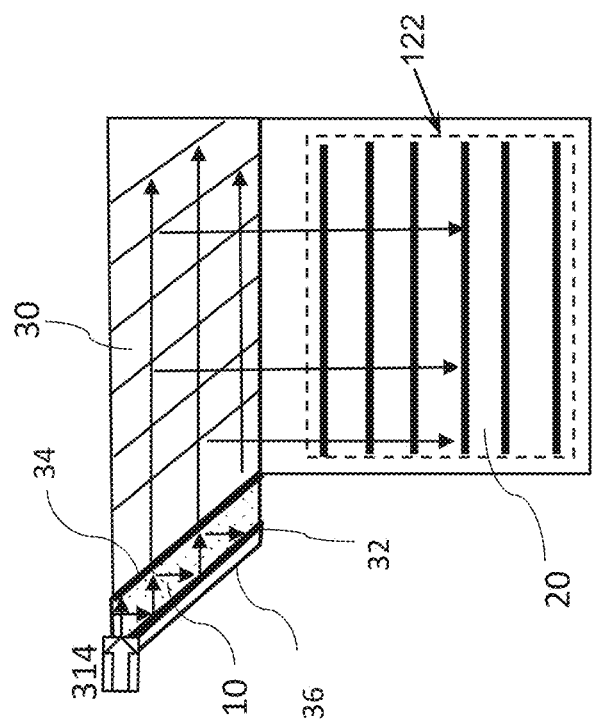

FIG. 3 is similar to FIG. 2A, with equivalent features labeled similarly. FIG. 3 illustrates that image projector 314 can be oriented at a different angle but still produce the same propagation angle in the lightguide. Where a coupling-prism is used (not shown in detail, but implicit in the illustrated structure), the prism may be applied to the front or back (first or second) major surface (31 or 33). Alternatively, a coupling prism may be applied to surface 32 (or protective cover 36) in a region at which a reflective coating is provided with an opening.

Figure 4:
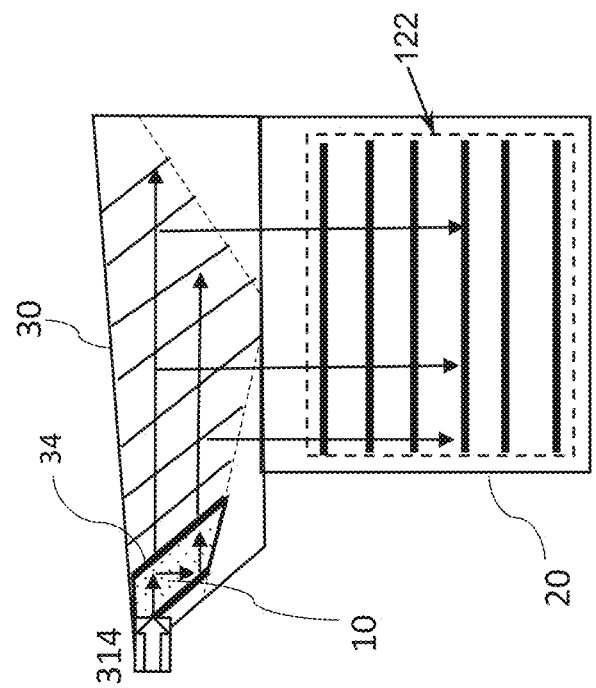
FIGS. 3 and 4 are views similar to FIG. 2A illustrating variant implementations of the embodiment of FIG. 2A.

FIG. 4 is similar to FIG. 3, but illustrates that the length of the interface between PRLG 10 and second light guide portion 30 can be varied according to the needs of each design. This is controlled by the reflectivity of surface 34, where lower reflectivity and higher transmittance will make the length of the region where effective aperture expansion occurs shorter. In this illustration, the deployment of facets 12 is also selective, according to a determination of which regions of facets are needed to provide parts of a field of view reaching the "eye motion box" from which the image is to be viewed. In all other respects, FIGS. 3 and 4 are equivalent in structure and function to FIGS. 2A and 2B, described above.

FIG. 5 is an isometric view corresponding to the light guide arrangement from the embodiment of FIGS. 2A and 2B. FIG. 6 is a similar view, but illustrates additionally a longitudinal partial reflector 38 placed within PRLG 10, parallel to surfaces 31 and 33, to further improve the vertical aperture expansion and enable smaller projector optics. Partial reflector 38, or another similar reflector, can also be introduced elsewhere in the light guide.

FIG. 7 illustrates a further option according to which the PRLG, here designated 10T, is tilted so that only one of the two sets of beams emerging from surface 34 enters second light guide portion 30. Here too, an internal partial reflector (not shown), similar to partial reflector 38 but located within second light guide portion 30, may be provided to ensure filling of the light guide with the projected image.

FIGS. 8A and 8B illustrate a variant of the embodiment of FIG. 3, where the second light guide portion is itself implemented as a rectangular light guide 30R. Thus, in addition to the first pair of mutually-parallel major surfaces 22*a* and 22*b*, second light guide portion 30R has a second pair of mutually-parallel major surfaces 22*c* and 22*d*, perpendicular to surfaces 22*a* and 22*b*, so that second light guide portion 30R conveys the light beams by four-fold internal reflection, as illustrated schematically by arrows in FIG. 8B. In this case, the set of partially-reflecting surfaces 12 couple the light beams out from second light guide portion 30R and direct them into third light guide portion 20, where they propagate by two-fold internal reflection and are coupled-out by embedded partial reflectors 28, as before. In order to support internal reflection at surface 22*d*, a small air gap, or a layer of low-refractive-index adhesive, is preferably interposed between light guides 30R and 20. Alternatively, a multi-layer dielectric coating may be applied to surface 22*d* designed to mimic TIR behavior.

Parenthetically, as best understood with reference to the side view of FIG. 8B but relevant to multiple embodiments described herein, coupling-out of the light beams of the image by partially-reflecting surfaces 28 preferably occurs selectively to one of the images propagating by two-fold internal reflection within third light guide portion 20 while surfaces 28 are preferably substantially transparent to light beams of the second image, which would otherwise form an unwanted "ghost" image. Such angularly-selective reflectivity is achieved by appropriate multi-layer dielectric coatings designed using standard software tools and implemented using standard coating techniques, all as is known in the art.

Turning now to a further group of implementations illustrated in FIGS. 9A-16D, these relate to optical systems in which an extensional direction of PRLG 10 is significantly non-parallel to the direction of the chief ray of the image propagating towards the coupling-out configuration. The extensional direction of PRLG 10, like the "length" mentioned before, is taken to be defined by a line of intersection between (for example) first major surface 31 and third major surface 32, while the chief ray of the image is the direction of light beams corresponding to the central pixel of the image in the path through the third light guide to the coupling-out configuration. In this group of implementations, the extensional direction is significantly non-parallel to this chief ray, meaning that the extensional direction forms an angle of at least 60 degrees with the chief ray, and more preferably at least 70 degrees, with certain particularly preferred implementations being substantially orthogonal, meaning within a range of 90±10 degrees, as illustrated here. As an alternative definition, particularly in the case of a coupling-out configuration based on partially-reflecting facets, the extensional direction of the PRLG 10 may be substantially parallel (±20 degrees, and in some cases ±10 degrees) to an extensional direction of the coupling-out facets 28. This orientation of the PRLG 10 makes the architecture much more similar to that of the aforementioned '070 patent, but with the advantages of a rectangular light guide which does not rely on embedded reflectors, as described above. Instead of embedded reflectors, the set of partially-reflecting surfaces 12 in second light guide portion 30 are external to the rectangular light guide, thereby relaxing many of the stringent requirements for precision that are specific to rectangular light guides with embedded reflectors.

In this case, a length of a light path from leaving the PRLG 10 to the furthest point at which the light beams are deflected by partially-reflecting surfaces 12 is relatively short compared to the embodiments described previously. In some cases, a maximum length of a light path D of the light beams from being emitted from the PRLG until being redirected by one of the set of partially-reflecting surfaces is shorter than the length L of the PRLG 10 along a direction parallel to a line of intersection between first major surface 31 and third major surface 32.

Figures 9A, 9B:
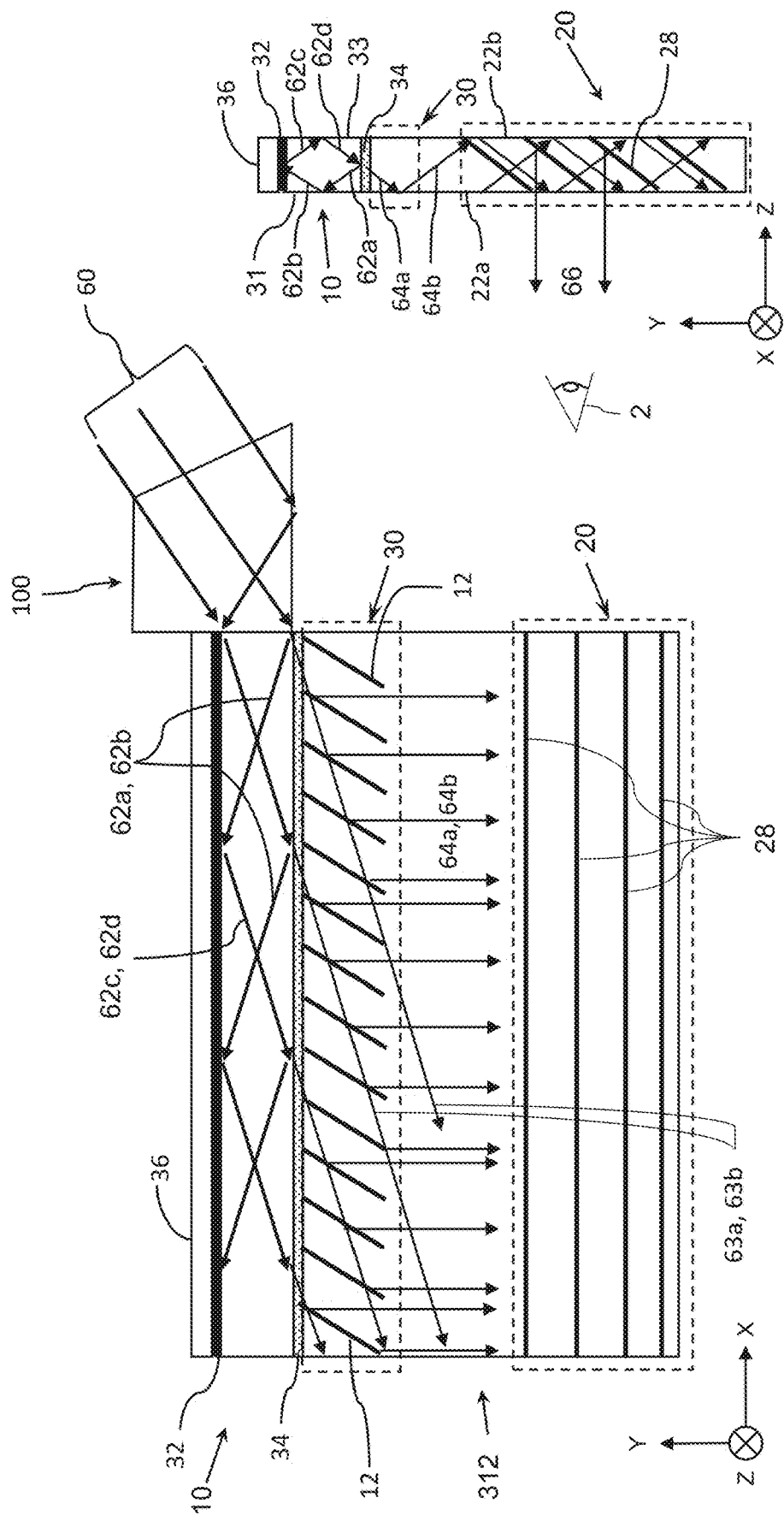
FIGS. 9A and 9B are a front view and a side view, respectively, of an alternative embodiment of the optical system of FIG. 1.

Referring now specifically to FIGS. 9A and 9B, as before, a PRLG 10 is defined here external parallel faces 31 and 33, a top reflector 32 and a bottom partial reflector 34 (referred to above as first, second, third and fourth surfaces, respectively). Partially reflective surface 34 is optically coupled with a second light guide portion 30 and to third light guide portion 20, which are preferably integrated into a single light-guide optical element (LOE) 312. An optical coupling-in configuration, here shown as a coupling prism 100, couples the image 60 into PRLG 10.

In the illustrated embodiment, LOE 312 is a thin slab-type waveguide having a pair of parallel faces 22*a*, 22*b*, which are advantageously coplanar with surfaces 31 and 33, respectively. The set of mutually-parallel partially-reflecting surfaces 12 in second light guide portion 30 serve as a light redirecting arrangement that redirects (deflects) the light coupled into second light guide portion 30 toward the coupling-out configuration, implemented here as an additional set of partially-reflecting internal surfaces (or "facets") 28, in third light guide portion 20.

Second and third light guide portions 30 and 20 may be non-overlapping regions, such that the third light guide portion 20 occupies a lower portion of the LOE 312 that is not occupied by the second light guide portion 30 (as shown). Alternatively, in certain embodiments, the two portions 30 and 20 may partially overlap (along the "y" direction).

Partially-reflecting surfaces 12 are non-parallel to coupling-out partially-reflecting surfaces 28. Specifically, surfaces 28 are inclined obliquely to the major surfaces 22*a*, 22*b* in order to perform coupling-out of the light propagating within the LOE 312, whereas partially-reflecting surfaces 12 are in many implementations orthogonal to major surfaces 22*a*, 22*b*. Additionally, the extensional directions of facets 12 and 28, defined by a line of intersection of the plane of each surface with one of the major surfaces 22*a*, 22*b*, are also non-parallel, with the orientation of facets 12 chosen to deflect light beams emitted from PRLG 10 downwards (along the "y" axis) towards, and typically roughly perpendicular to, the extensional direction of facets 28.

The configuration of the facets 12 and facets 28 is such that, when the partially reflective surface 34 couples the image propagating within the PRLG 10 by four fold internal reflection (the 4 images represented schematically by chief ray light paths 62*a*, 62, 62*c*, 62*d*) into LOE 312, the coupled-in image propagates within second light guide portion 30 by internal reflection (light paths 63*a*, 63*b*) at major surfaces 22*a*, 22*b* in a first guided direction, with a proportion of intensity of the image reflected (deflected) at facets 12 so as to be redirected towards third light guide portion 20 in a second guided direction, and propagates within LOE 312 by internal reflection (images 64*a*, 64*b*) at surfaces 22*a*, 22*b*, with a proportion of intensity of the image reflected (deflected) at the partially reflective surfaces 28 so as to be directed outwards from one of the parallel faces 22*a* as a visible image 66, seen by the eye 2 of the viewer. The first guided direction is generally oblique to the extensional direction of PRLG 10 (i.e., oblique to surface 34).

Figure 10B:
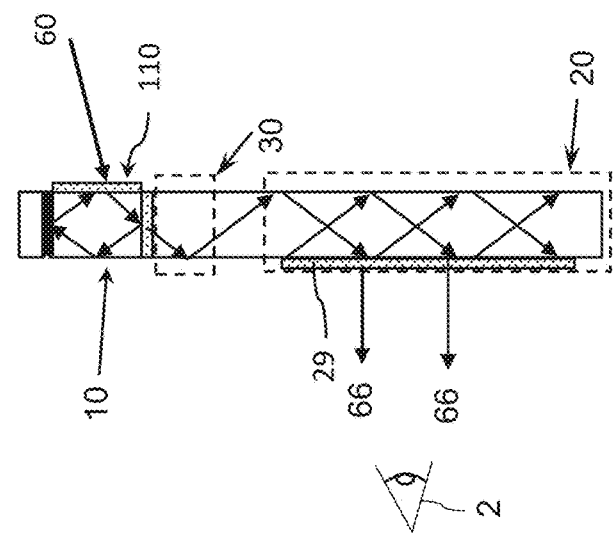
FIGS. 10A and 10B are views similar to FIGS. 9A and 9B, respectively, employing diffractive optical elements for a coupling-in arrangement and a coupling-out configuration.
Figure 10A:
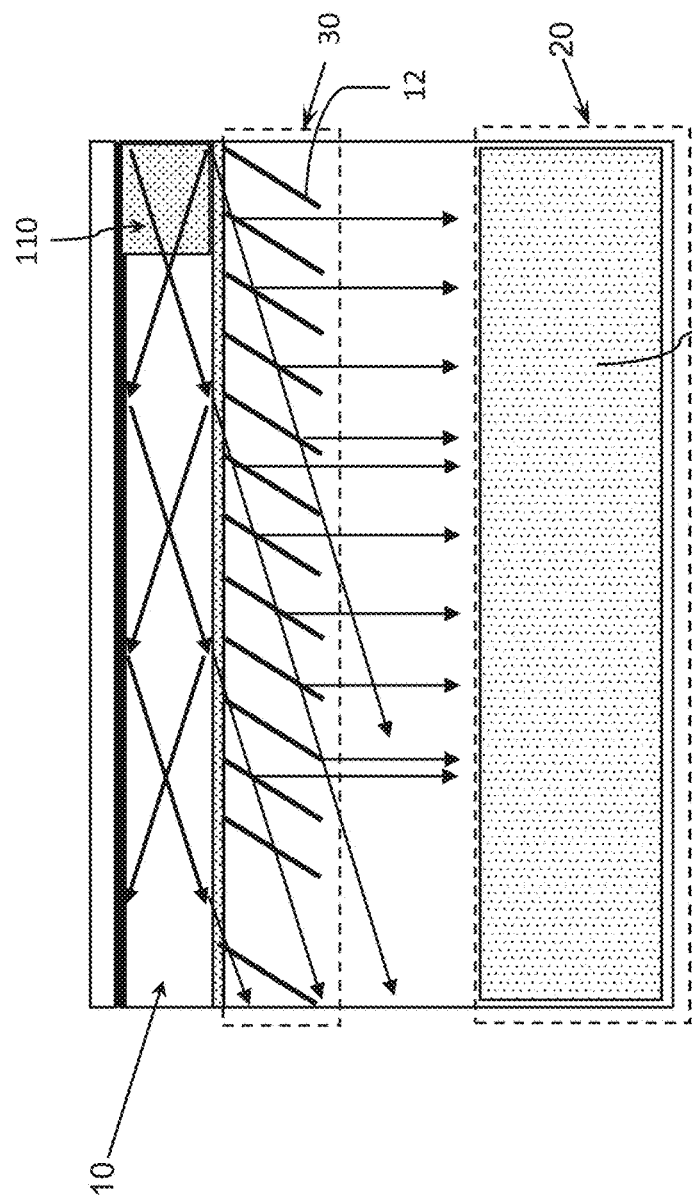

FIGS. 10A and 10B show an embodiment similar to the embodiment illustrated in FIGS. 9A and 9B, except that the coupling-in arrangement and the coupling-out configuration are here implemented using diffractive elements. In particular, the optical coupling-in configuration 110, in the form of a diffractive element (e.g., diffractive grating) deployed on one of the surfaces of PRLG 10 is used to couple the image 60 into the PRLG. The coupling-in diffractive element is shown as being deployed in association with side face, to accommodate a preferred but non-limiting deployment of the optical image generator at the backside of the optical aperture multiplier. The output coupler is also a diffractive element 29, coupling out the light beams of the image 66 toward the eye 2. The combination of two diffractive elements 110 and 29 enables cancelation of chromatic dispersion caused by the diffraction process (after taking into consideration a rotation introduced by facets 12).

In alternative embodiments, the beam redirecting arrangement of second light guide portion 30 may additionally, or alternatively, be implemented using a diffractive optical element. In this case, cancelation of chromatic aberration introduced by the diffractive elements will typically be achieved by ensuring that each output beam is parallel to the corresponding beam input into the first diffractive optical element. FIGS. 27A and 27B illustrate such a variation of FIGS. 10A and 10B. In this case, second light guide portion 30 diverts the light beams that exit through partially-reflecting surface 34 using a diffractive optical element (DOE), such as a surface grating 400 as shown or an embedded grating. Dispersion is compensated as commonly practiced by assuring that the entrance beam orientation is parallel to exit beam. By implementing the DOE in second light guide portion 30 (i.e., not associated with any surface of PRLG 10), the structure of PRLG 10 is kept as simple as possible, thereby providing manufacturability and image quality advantages similar to those described in relation to the reflective implementations described above.

FIGS. 11A-11C describe schematically in flattened angular space the beam propagation shown in FIGS. 9A and 9B (using a representation that is elaborated upon further in the aforementioned '070 patent). The circles 200a and 200b represent the TIR angles of surfaces 22a and 22b, respectively, where angles falling within the circles correspond to ray directions which will escape through those surfaces. Circle 202 represents the TIR angles of surface 32 while the dashed circle 204 represents the partial transmission region of the partial reflector 34. The fourfold images are marked as a1, a2, a3 and a4 (equivalent to 62a-62d, above). FIG. 11A describes the distribution inside PRLG 10. Here, only images a3 and a4 are within the circle 204, so that part of their energy is transferred to LOE 320.

FIG. 11B shows the angular distribution in second light guide portion 30. Here, line 206 represents the angle of the facets 12 that are perpendicular to faces 22a and 22b. These facets reflect images a3 and a4 (equivalent to 63a,63b) in a different direction of propagation marked as b1 and b2 (equivalent to 64a,64b).

FIG. 11C shows the angular distribution within third light guide portion 20, where facets 28 (angularly represented as line 208) reflect image b2 or b1 out of the lightguide as image c (equivalent to 66).

In alternative implementations, facets 12 can be oriented obliquely to external surfaces 22a, 22b (and not parallel to facets 28) as described in angular space of FIGS. 12A-12C. In FIG. 12A, the distribution is equivalent to 11A, except that here the orientation of the images is slanted so that the final output image is straight.

In FIG. 12B, the orientation of oblique facets 12 is shown as diagonal line 210. This facet reflects image a3 (equivalent to 63a or 63b) only onto b1 (equivalent to 64a or 63b). The propagation of b1 within LOE 312 generates also its conjugate image b2 (so 64a and 64b coexist). The coating of the oblique facets 12 should be optimized to also be transparent (minimal reflection) at incident angles corresponding to rays of images a4 and b2, to prevent loss of light in undesired directions (ghosts). An advantage of such oblique facets is that they scramble the light polarization, thereby reducing non-uniformities, and that the production of such facets does not require tight angular tolerances.

In the above configuration, where facets 12 reflect the downward-propagating image or images escaped from the PRLG, the rays propagating at the steepest angle to the surface 34 (i.e., small "angles of incidence" relative to a normal to surface 34) correspond to the part of the image field which lies closer to the image projector, while the rays propagating at shallower angles (i.e., larger "angles of incidence" relative to a normal to surface 34) correspond to the part of the image field which is furthest from the image projector. This is advantageous, since the rays with the longest propagation paths undergo relatively fewer internal reflections within the light guides, and are therefore less susceptible to image degradation due to any imperfections in the light guides.

Figure 13B:
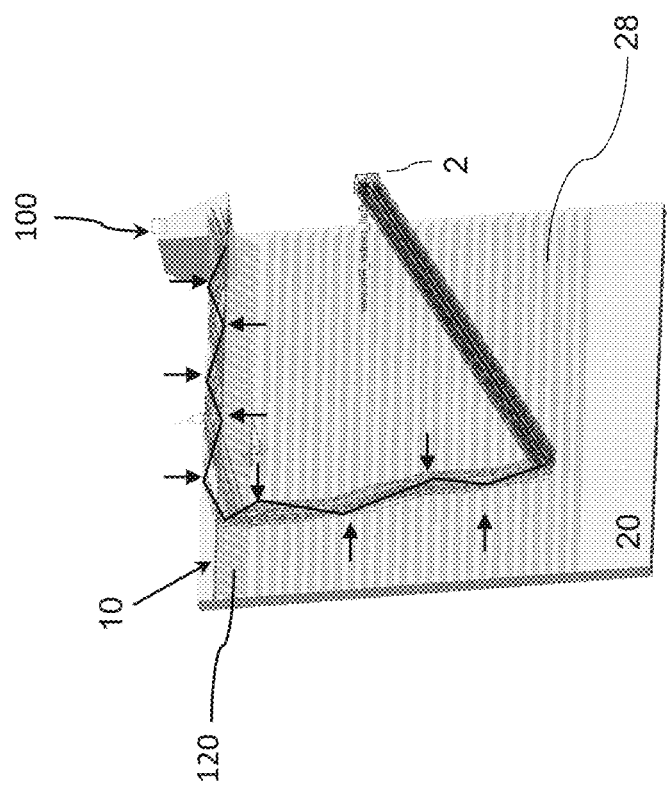
FIGS. 13A and 13B are schematic isometric ray plots for light rays corresponding to a top-right corner and a bottom-left corner, respectively, of an image displayed by the optical system of FIGS. 9A and 9B.
Figure 13A:
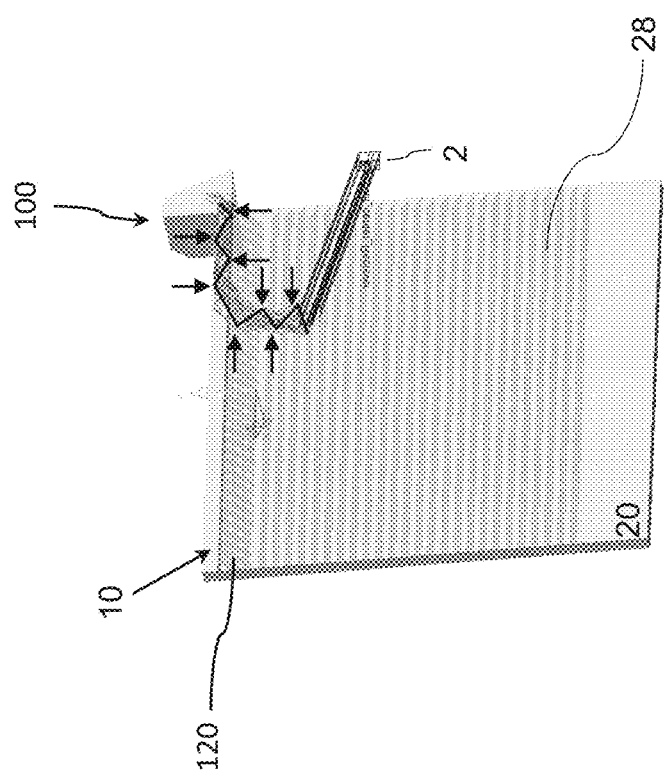

FIGS. 13A and 13B show ray tracing from the coupling prism 100 to the eye 2. For clarity of presentation, one particular ray in each drawing is emphasized as a heavy line, and its points of reflection are highlighted by arrows. As seen here, the beam propagating the furthest (FIG. 13B) propagates at the shallowest angle (undergoing a similar number of reflections as the steeper beams, despite having a longer propagation distance) and therefore power loss and/or image degradation is reduced.

Figure 14:
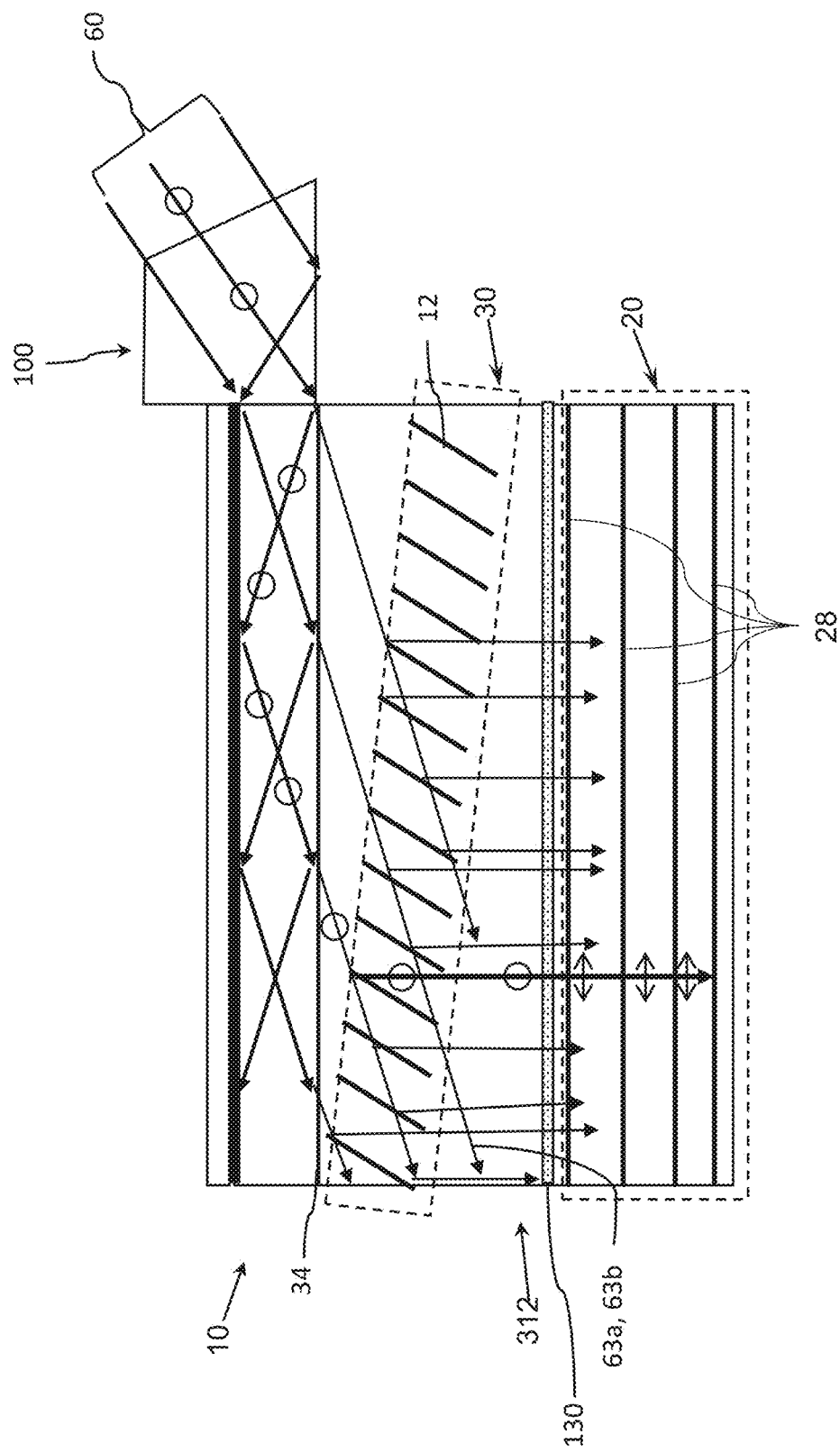
FIG. 14 is a view similar to FIG. 9A illustrating a variant implementation and detailing a polarization management scheme.

FIG. 14 is equivalent to FIG. 9, adding schematic description of the polarization of one of the beams. The illumination beam 60 is shown here S-polarized (circles represent polarization vector perpendicular to plane of the drawing). The coating on plane 34 is convenient to design for this polarization (since this avoids needing to address the inherent 100% transmission at the Brewster angle). As the beam propagates along PRLG 10, it generally preserves its polarization orientation in keeping with the symmetry of the lightguide. This beam subsequently impinges on perpendicular facets 12 (displayed in FIGS. 9 and 11) which will have optimal orientation (S-polarized) relative to these facets' coatings. In certain preferred embodiments, a polarization rotation element (half-wave plate) 130 (or a depolarizer) may be introduced after second light guide portion 30 so that these beams will rotate orientation (shown as double headed arrows), thereby impinging on facets 28 (that are rotated relative to facets 12) also with S-polarization relative to these facets.

In the case that facets 12 are oblique to the LOE surfaces (as in FIG. 12), there may be no need for polarization rotation element 130, or it may advantageously be replaced with a depolarizer.

FIG. 14 also illustrates an option according to which second light guide portion 30 (where facets 12 are located) is "tilted" relative to the extensional direction of PRLG 10, to improve the collection of the beams emerging from PRLG 10 through reduced mutual obscuration by successive facets. Other configurations are also possible depending on beam angles.

The LOE side-view in FIG. 9B shows PRLG 10, second light guide portion 30 and third light guide portion 20 all stacked vertically, one on top of the other, and preferably having coplanar (shared) external surfaces. This option may be preferred in many cases due to simplicity of design and advantages in the manufacturing process, where the relevant components for multiple such products can be produced separately, combined as a stack, and then sliced and polished to form multiple optical systems from the single stack. However, the system is not limited to such a design. FIGS. 15A-15F illustrate schematically a number of alternative implementations in which angles and/or dimensions may vary between the various components.

Figure 15F:
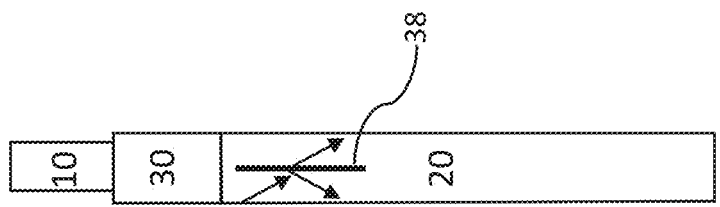
FIGS. 15A-15F are schematic side views similar to FIG. 9B and illustrating variant implementations of the optical system.
Figure 15E:
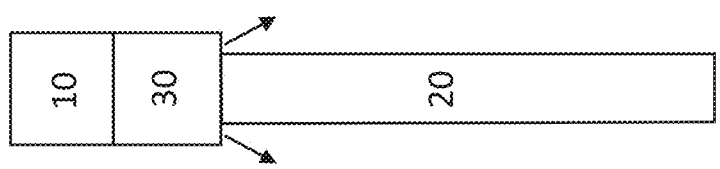
Figure 15D:
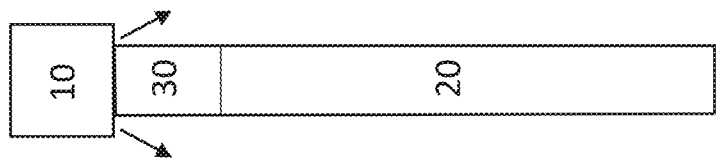
Figure 15C:
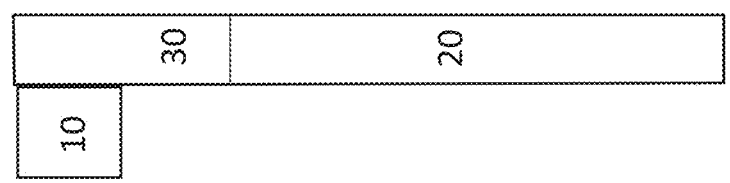
Figure 15B:
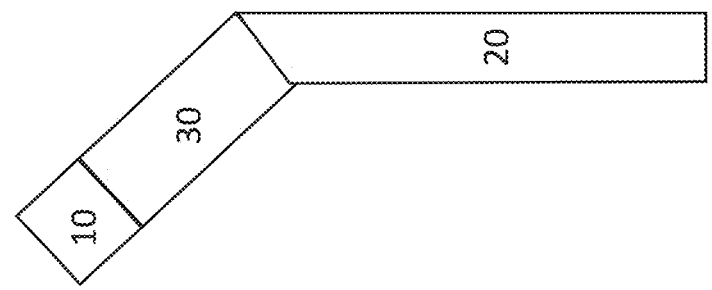
Figure 15A:
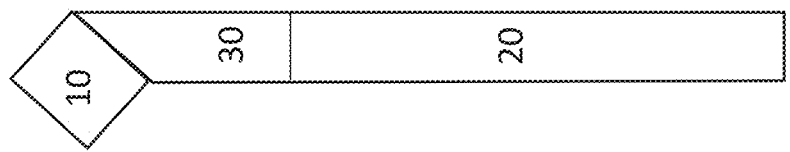

FIG. 15A shows an alternative where PRLG 10 is tilted relative to second light guide portion 30. In this case, only one image (a3 or a4 of FIG. 11A-11C) will be coupled into second light guide portion 30.

In FIG. 15B, a tilt is introduced between the second and third light guide portions, so that only one image b1 or b2 propagating within second light guide portion 30 is coupled from second light guide portion 30 into third light guide portion 20.

In FIG. 15C, PRLG 10 is coupled into second light guide portion 30 through one of the major surfaces of second light guide portion 30. This implementation may employ only one emitted image from PRLG 10, or a second image may be recovered by implementing a top edge of second light guide portion 30 with a mirror surface.

In FIG. 15D, PRLG 10 is wider than the other sections. This arrangement is possible while taking into consideration that some of the light coupled out at the lower face may be lost (shown as arrows) unless the overhanging regions of the bottom face have a reflective coating or satisfy conditions for TIR, while the region of coupling with second light guide portion 30 is implemented with a partially reflecting coating as previously described. FIG. 15E shows that second light guide portion 30 can be wider than third light guide portion 20. Here too, the excess width may cause light loss (shown as arrows).

FIG. 15F illustrates a case where PRLG 10 is narrower than second light guide portion 30 (which could alternatively be a step-up of thickness between second light guide portion 30 and third light guide portion 20). In such case, it is preferable to introduce a longitudinal partial reflector 38 (as described above with reference to FIG. 6) that acts as a beam splitter (shows by arrows), thereby helping to enhance uniformity of the image light beams within third light guide portion 20.

Any and all of the configurations described herein (above and following) may be applicable also for head-up displays as well as for near-eye-displays.

Turning now to FIG. 16, this shows an optical system similar to that of FIG. 9 but where a surface or coating 340 supporting total internal reflection (TIR) is added below second light guide portion 30, such that second light guide portion 30 becomes itself a rectangular light guide supporting propagation by four-fold internal reflection. Consequently, light that is transmitted through partially-reflecting surfaces 12 and would otherwise have been lost in a direction that doesn't contribute to the output image is instead recycled by internal reflection until it reaches additional surface 12.

Figures 16B, 16C:
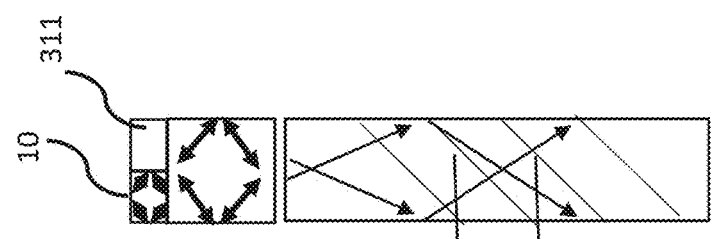
FIGS. 16B and 16C are side views of the optical system of FIG. 16A according to two variant implementations.
Figure 16D:
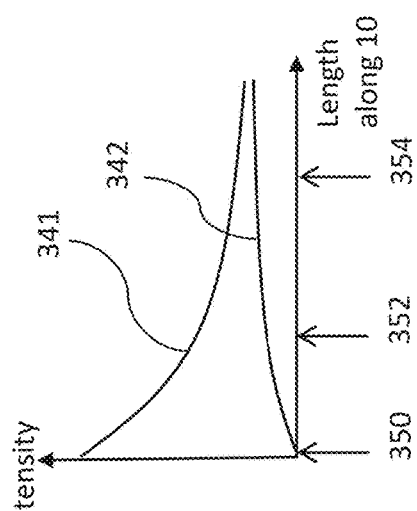
FIG. 16D is a schematic plot illustrating the relative light intensity between the PRLG and the second light guide portion as a function of distance along the light guides in FIG. 16A.
Figure 16A:
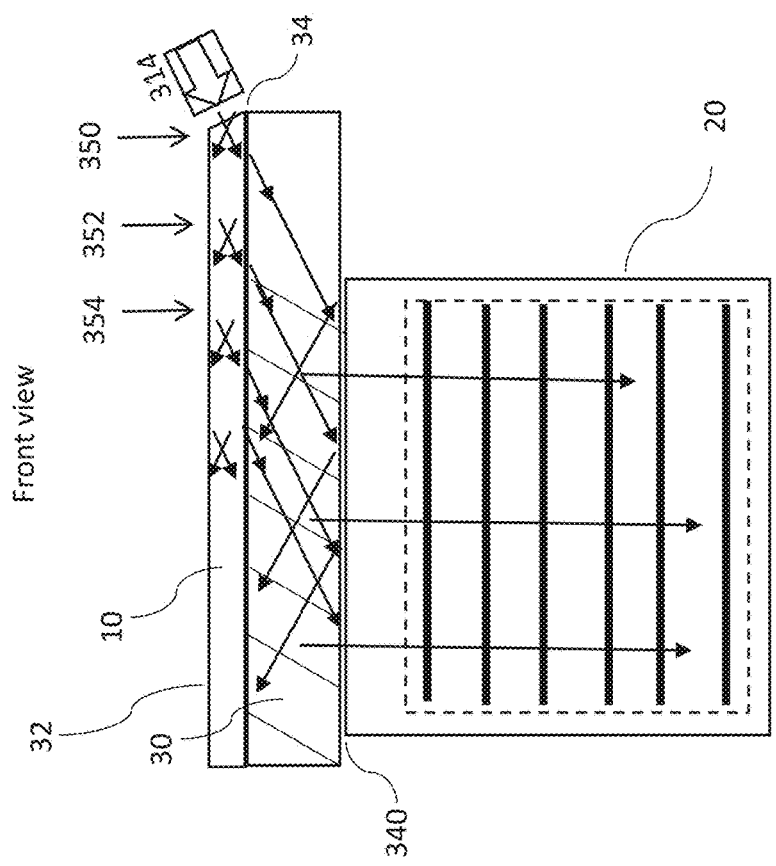
FIG. 16A is a view similar to FIG. 9A illustrating a variant embodiment in which a second light guide portion of the optical system is implemented as a rectangular light guide.

In the front view of FIG. 16A, the image projector having a narrow optical aperture 314 injects light beams corresponding to a collimated image into PRLG 10 (equivalent to PRLG 10 of FIG. 9). The beams propagate in this lightguide by four-fold internal reflection being reflected from top surface and side surfaces by TIR or reflecting coatings, while being partially transmitted and reflected by surface 34 (equivalent to surface 34 in FIG. 9). Due to the presence of TIR surface 340, second light guide 30 also functions as a rectangular light guide, guiding light beams through four-fold internal reflection, where the sides reflect by TIR, top surface 34 by partial reflection and the bottom surface 340 by TIR.

Light beams are incident on surfaces/coatings 34 and 340 at equivalent angles, so their respective coatings and selection of materials of the light-guide portions must be such to perform partial reflection 34 and TIR at 340. TIR is most simply maintained by use of a layer of low refractive index adhesive or other low-index material. The coating of partially-reflecting surface 34 is preferably implemented using multi-layer dielectric coatings, as discussed above.

FIG. 16B shows a side view of a first implementation in which PRLG 10 has the same width as rectangular light guide 30, while FIG. 16C shows an alternative implementation in which PRLG 10 is narrower than rectangular light guide 30. In this second case, an additional rectangular light guide element 311 may be added adjacent to PRLG 10 having a partial reflector between them so that light from PRLG 10 can couple directly to rectangular light guide 30 or indirectly, first to additional rectangular light guide element 311 and then to rectangular light guide 30.

FIG. 16D shows schematically an exemplary plot of an intensity distribution along PRLG 10 (line 341) and along rectangular light guide 30 (line 342). After light injection, maximal power is initially contained within PRLG 10 and no power is in rectangular light guide 30 (at the location marked as 350 in FIG. 16A and in plot FIG. 16D). The coupling between the lightguides (through surface 34) causes "diffusion" of intensity from PRLG 10 to rectangular light guide 30 which progresses as shown at an intermediate position marked 352, and reaches approximate equilibrium further along the lightguides (location marked 354). At equilibrium, the intensity is spread over the larger cross-sectional area of PRLG 10 plus rectangular light guide 30 and, since rectangular light guide 30 preferably has a larger cross-sectional area than PRLG 10, a majority of the light energy is located within rectangular light guide 30. Different angles of the field will achieve equilibrium at different distances along the lightguide.

The continuous "leakage" from PRLG 10 to rectangular light guide 30 generates effective expansion of the injected aperture so lightguide rectangular light guide 30 is fully illuminated despite having larger cross-section than PRLG 10.

Optionally, one or both of coatings 34 and 340 can be angularly selective to assure that the light beams are coupled out from PRLG 10 to rectangular light guide 30 and from there to third light guide portion 20 according to the desired optical design and observer eye location (not shown).

FIGS. 17A-22 relate to a further set of embodiments of the present invention which are conceptually similar to the embodiments of FIGS. 9A-16D, but with the sequence of the components switched. Specifically, instead of employing a second light guide portion interposed between PRLG 10 and third light guide portion 20, a second light guide is here provided "above" PRLG 10, i.e., on the far side from third light guide portion 20.

Thus, referring to FIGS. 17A and 17B, there is shown an optical system for directing light beams corresponding to an image from an image projector towards a user for viewing, the optical system including a partial-internal-reflection rectangular light-guide (PRLG) 10 formed from a transparent material and having first and second mutually-parallel major surfaces 31 and 33 and a third major surface 230, perpendicular to the first and second major surfaces. The first, second and third major surfaces 31, 33 and 230 support internal reflection for incident angles above a critical angle, at least the third major surface being transmissive for incident angles smaller than the critical angle. PRLG 10 also has a fourth major surface 232 parallel to third major surface 230. At least part of fourth major surface 232 is provided with a partially-reflecting coating that is partially reflecting for angles of incidence greater than the critical angle and transparent for the incident angles smaller than the critical angle.

A second light guide 221 having a pair of mutually-parallel major surfaces (front and back as viewed), preferably perpendicular to fourth major surface 232, for conveying the light beams by internal reflection. Second light guide 221 is optically coupled to at least part of an area of partially-reflecting coating of the fourth major surface 232, and contains a set of planar, mutually-parallel, partially-reflecting surfaces (or "facets") 219 located between, and non-parallel to, the pair of major surfaces.

A third light guide 20, adjacent to third major surface 230, includes a coupling-out configuration 122 deployed for coupling-out the light beams propagating within the third light guide by internal reflection so as to direct the light beams towards the user. A coupling-in arrangement 100 is deployed to couple light beams corresponding to a collimated image from the image projector into PRLG 10 so as to propagate within the PRLG 10 by four-fold internal reflection at the first, second, third and fourth major surfaces.

The light beams from the image projector propagating by four-fold internal reflection within PRLG 10 are incident on fourth major surface 232 at incident angles greater than the critical angle, and are progressively emitted from the PRLG through the partially-reflecting coating so as to enter second light guide 221, where they are redirected by reflection at the set of partially-reflecting surfaces 219 so as to be incident on fourth major surface 232 at incident angles less than the critical angle. The downward-deflected rays are shown here as dashed arrows for clarity. The deflected light waves then traverse PRLG 10 and pass through third major surface 230 to enter third light guide 20, propagating within the third light guide by internal reflection and being coupled-out from third light guide 20 by the coupling-out configuration 122 towards the user. The nomenclature used for labeling of the light rays is similar to that in FIG. 9B.

The coating of fourth major surface 232 may have angular-reflectivity profile as shown in FIG. 17C. At large angles (relative to a normal to the surface) 222a the coating is partially reflective, while at small angles 222b the coating is transmissive, thereby enabling the reflected light to pass through surface 232 and traverse PRLG 10 into second light guide 20. As in FIG. 9, above, coupling-out configuration 122 may be implemented as a set of mutually-parallel partially-reflecting surfaces 28.

FIGS. 18A-18C illustrate in angular space progression of the light beams corresponding to a collimated image through the system of FIG. 17. In FIG. 18A, the TIR limit of coating 230 is represented as circle 231 and the partial reflector 232 angular spectrum is shown as 233. As in FIG. 11A above, circles 200a and 200b represent the TIR limits of the front and back surfaces. In this case, images a1 and a2 (of the four images propagating by four-fold images in PRLG 10) are coupled into second light guide 221 shown in FIGS. 18B1 and 18B2. FIG. 18B1 shows the case in which facets 219 are orthogonal to the major surfaces of second light guide 221, represented in angular space as line 237, while line 239 in FIG. 18B2 represents facets 219 according to an alternative implementation where they are oblique to the light guide surfaces, in which case they are implemented using coatings that are transparent to a1 and b2 but partially reflect a2 onto b1. FIG. 18C shows the coupling out from light guide 20 by facets 28 (like in FIG. 9B), where facets 28 are represented in angular space by line 208.

It should be note that, as exemplified by FIGS. 10A-10B and 27A-27B above relative to FIGS. 9A and 9B, variant forms of the embodiment of FIGS. 17A and 17B may also be implemented using diffractive optical elements to replace the coupling-in arrangement, the coupling-out configuration and/or facets 219, all as will be understood by a person having ordinary skill in the art.

Figure 19:
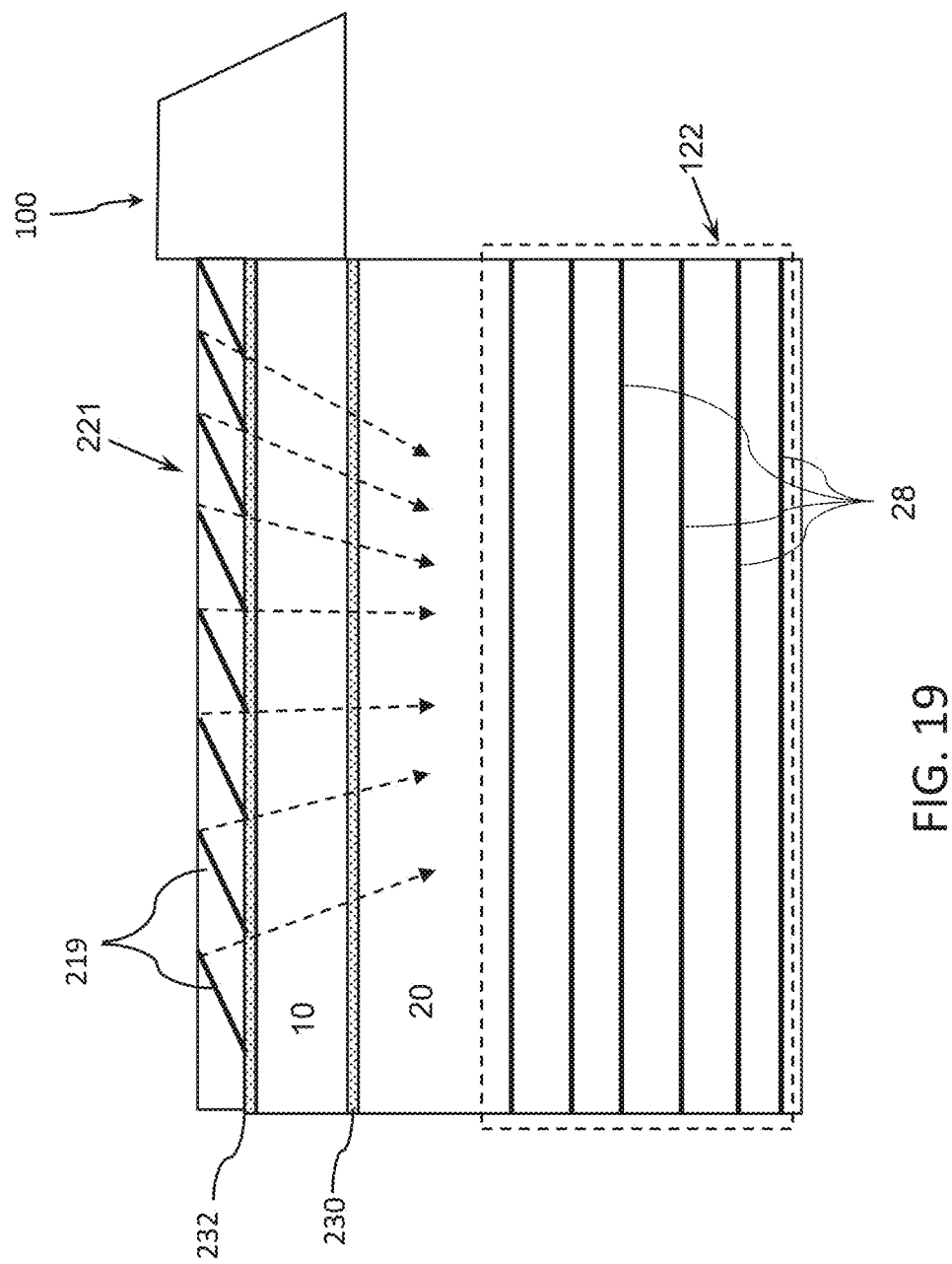
FIG. 19 is a schematic front view similar to FIG. 17A illustrating a geometrical requirement for continuity of a field of view of the display.

The light beams injected through prism 100 are multiple collimated beams at various angles that correspond to an image at infinity (a collimated image). FIG. 19 illustrates that, in order to illuminate continuously towards the center of the eye motion box (not shown), the spacing between the facets 219 should optimally vary. Facets closer to the projector should be at close spacing while facets further from the projector should be spaced at a larger distance. The dashed arrows (associated with different beams) show that the edges of the facet angles should overlap to create uniform illumination (propagation of all fields inside lightguide 10 are not shown for clarity). The configuration of variable facets spacing is applicable to all facet configurations disclosed herein.

Figure 20:
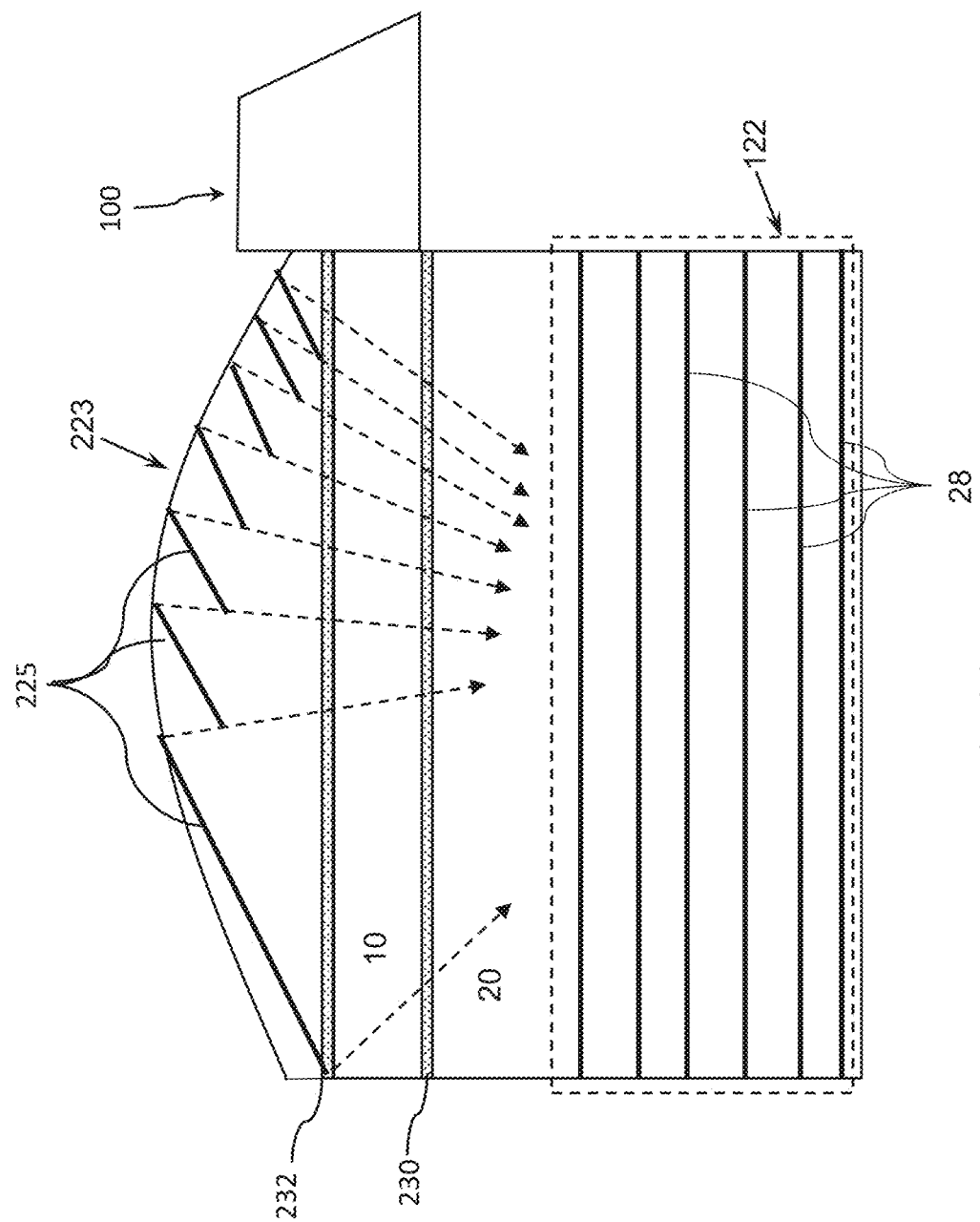
FIGS. 20 and 21 are schematic front views similar to FIG. 17A illustrating deployment of partially-reflecting surfaces in a second light guide along a curved profile, using non-overlapping and overlapping deployment of the partially-reflecting surfaces, respectively.

FIG. 20 shows that second light guide 221 (of FIG. 19) can be reshaped as a curved light guide 223 where facets 225 (equivalent to facets 219) are parallel and distributed along an arc. As in FIG. 19, the facets need to be distributed at spacing generating uniform illumination onto the eye motion box (dashed arrows). This configuration enables minimal obscuration of the further away facets therefore less power loss and better illumination. This configuration also provides clearer visibility through the lightguide with minimal facets obscuring the scenery, and may be of particular interest where a rounded overall form factor of a spectacle lens type design is required.

Figure 21:
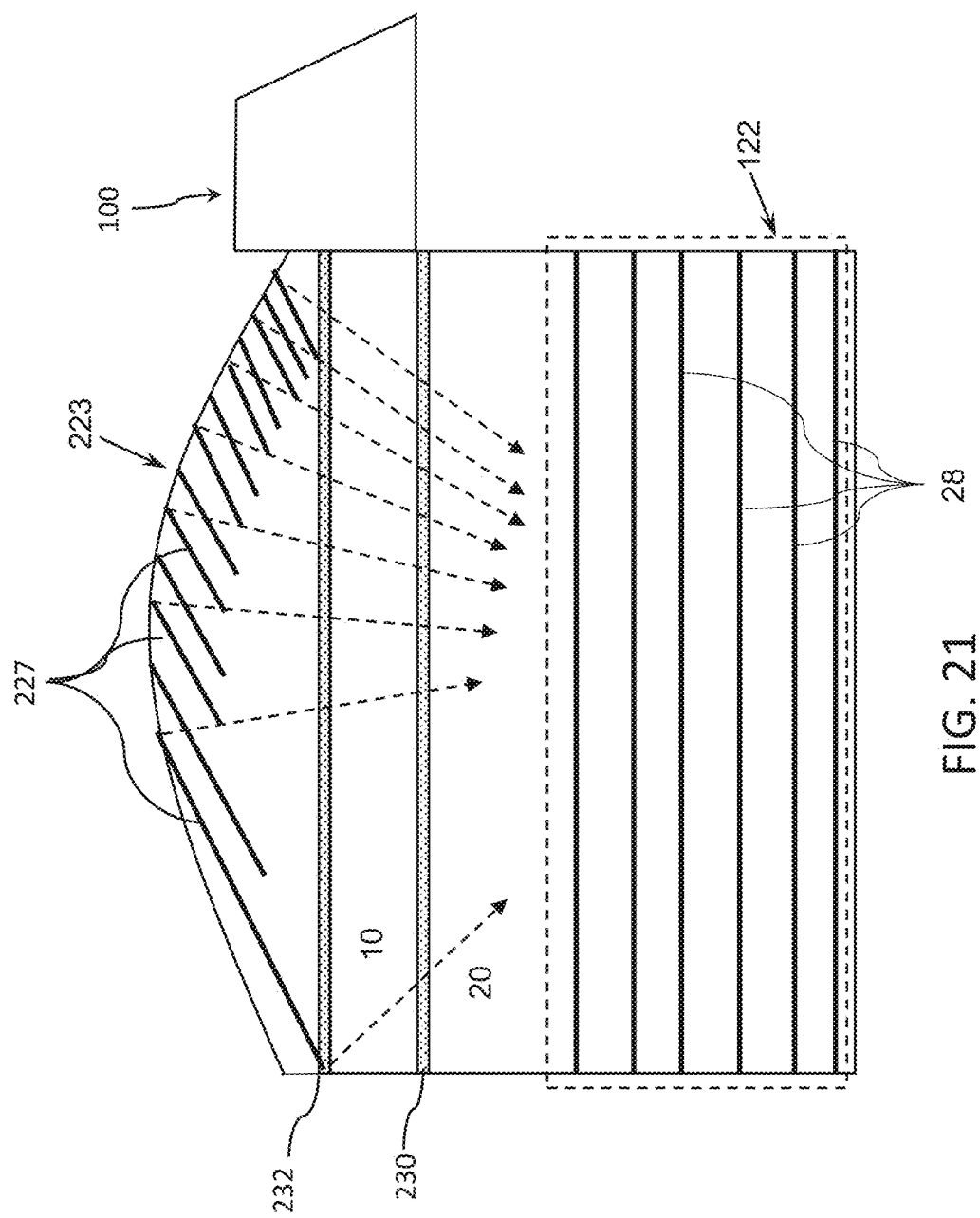

FIG. 21 shows an "overlapping facets" configuration in light guide 223, where the density of facets is increased beyond what is required to give continuous coverage at the EMB, such that reflections from more than one facet contribute to each ray reaching the EMB. This configuration may provide improved image quality and/or higher efficiency, particularly in a design employing oblique facets (as described above with reference to FIG. 18B2).

Figure 22:
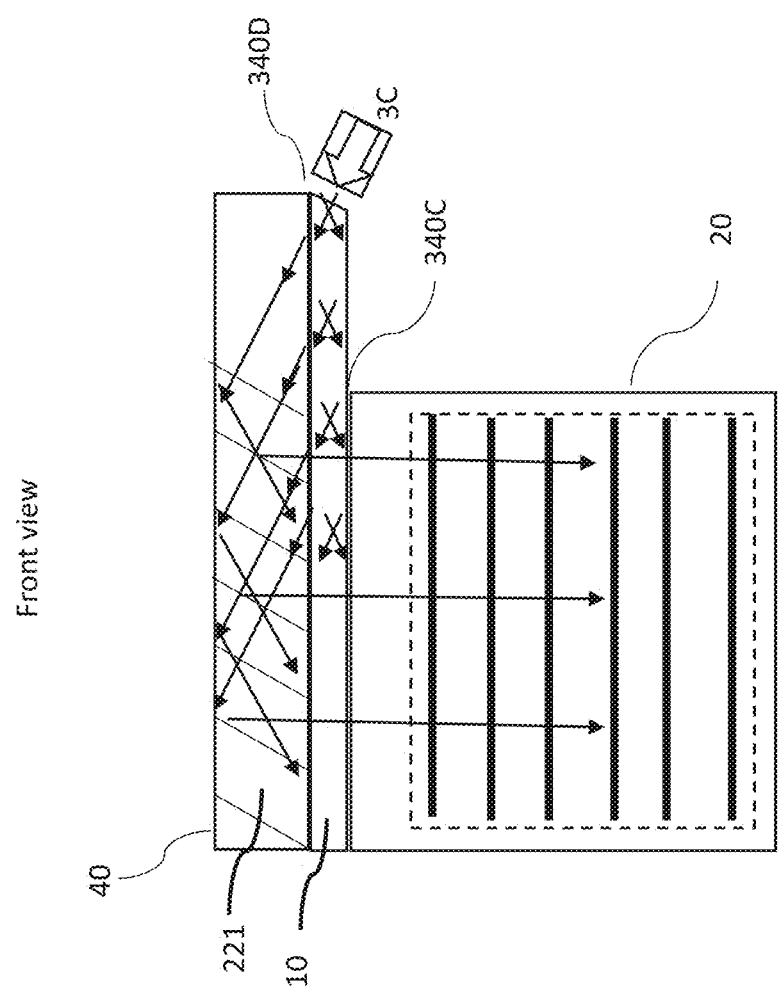
FIG. 22 is a view similar to FIG. 17A illustrating a variant embodiment in which a second light guide of the optical system is implemented as a rectangular light guide.

Turning now to FIG. 22, according to a further variant of the embodiment of FIG. 17A, second light guide 221 may have an additional major surface 40, parallel to the fourth major surface 34, which supports internal reflection of the light beams at incident angles greater than the critical angle. This renders second light guide 221 a rectangular light guide which supports propagation by four-fold internal reflection, thereby recycling light beams transmitted by the partially-reflecting surfaces 219 and reducing energy loss. In all other respects, the structure and operation of the optical system of FIG. 22 is similar to that of FIG. 17A.

Figure 23B:
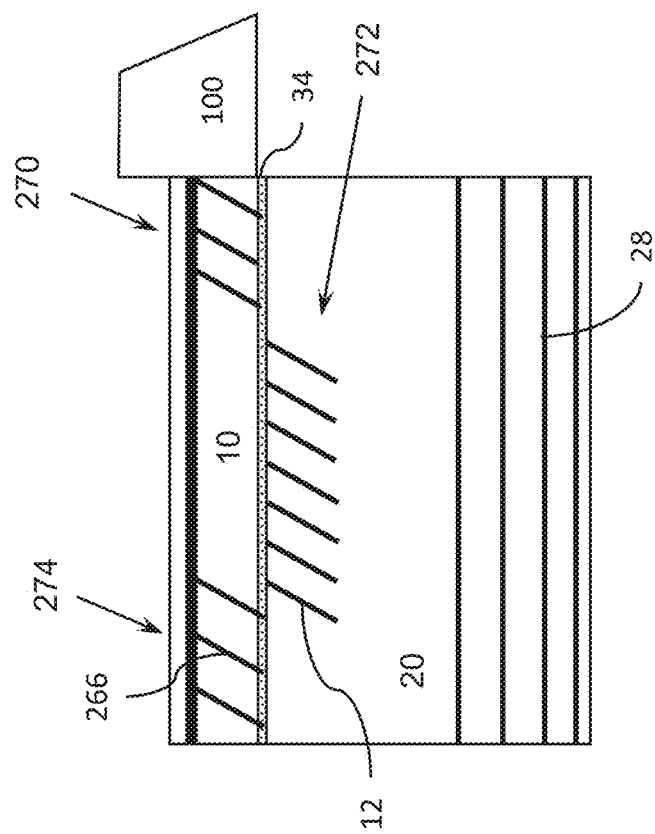
FIG. 23B is a front view similar to FIG. 9A illustrating a variant embodiment with limited use of internal partially-reflecting surfaces within the PRLG.
Figure 23A:
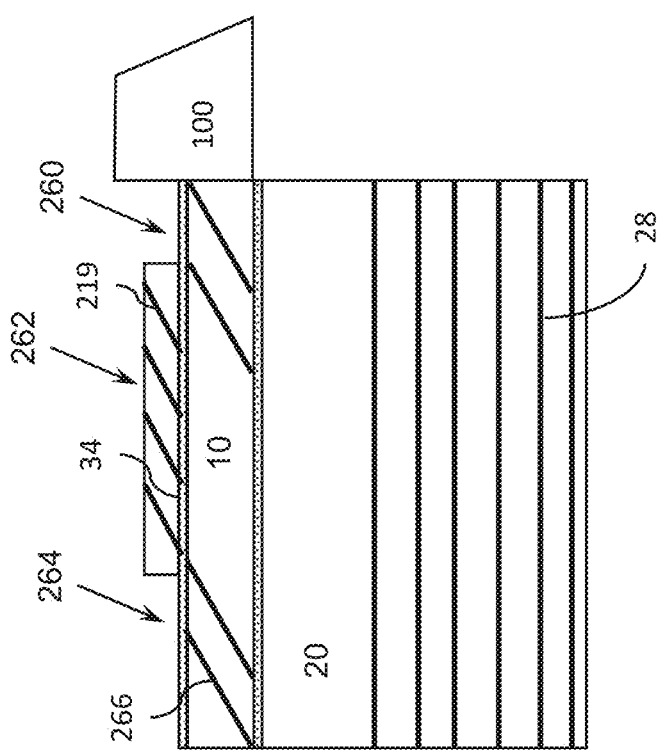
FIG. 23A is a front view similar to FIG. 17A illustrating a variant embodiment with limited use of internal partially-reflecting surfaces within the PRLG.

Turning now to FIGS. 23A and 23B, in all embodiments illustrated thus far, PRLG 10 is implemented without internal reflectors, instead relying on a partially-reflecting surface 34 for coupling out of the light beams, plus an additional beam redirecting arrangement (typically a set of facets 12, 219 or 225) to direct the light beams towards the coupling-out configuration. This approach has various advantages, as discussed above. Notwithstanding these advantages, and while preserving the primary functionality of coupling-out via a partially-reflecting surface 34, certain preferred implementations may employ a PRLG 10 which includes one or more partially-reflecting internal surface 266, parallel to the set of partially-reflecting surfaces of the second light guide portion (corresponding to facets 12, 219 or 225 in any of the above embodiments). Even in such cases, a majority of a length of PRLG 10 (not shown here to scale) may advantageously be free from internal reflectors. The inclusion of a number of facets within PRLG 10 may contribute to achieving compact size and/or improved power efficiency, as detailed below.

The internal facets within PRLG 10, where present, preferably fall into one of two categories. A first category is one or more partially-reflecting surface located towards the end of PRLG 10, i.e., in a third of a length of the PRLG distal to the coupling-in arrangement 100. In this case, the surface preferably has a reflectivity for at least one range of incident angles that is greater than 10%, and may in some cases be in excess of 50%, or in the case of a last facet, 100%. Such distal facets serve to couple-out any remaining light intensity which is still propagating within the PRLG and would otherwise be lost without reaching the viewer.

A second category is one or more partially-reflecting internal surface located near the beginning of PRLG 10, i.e., in a third of a length of the PRLG proximal to the coupling-in arrangement 100. In this case, the surface preferably has a low reflectivity of less than 10%, and in most cases less than 5%, and typically less than 3%, for light beams at the range of angles relevant for coupling-out of the desired image. These proximal facets are useful for compact implementations, where the exit angle of light beams through partially-reflecting surface 34 at the angles of propagation within PRLG 10 would otherwise require a larger overall system footprint.

These two categories of internal facets may be introduced both to embodiments employing facets 219 above the PRLG and to embodiments employing facets 12 below the PRLG, as will now be illustrated.

In FIG. 23A, a first, proximal section 260 of PRLG 10 includes facets 266, thereby enabling coupling out of light beams at the start of the lightguide. The facets at this section need to partially reflect images a1 and a2 while simultaneously transmitting images a3 and a4 (or, in the case of facets oblique to the front and back surfaces, reflect only one of the images). The second section 262 (equivalent to second light guide 221 or 223, described above) reflects images a1 and a2 (or one of them), and should be angularly selective to reflect only those images if second section 262 is implemented as a rectangular light guide. This section need not start from the input coupling prism. The last, distal section 264 of PRLG 10 can have facets of high reflectivity. It is possible to implement only section 260 with 262 or 262 with 264.

FIG. 23B shows an implementation based on FIG. 9. Section 270 has facets 266 within PRLG 10 partially reflecting a3 and a4 (or one of them) while transmitting a1 and a2. Section 272 (based on second light guide portion 30) contains facets 12 that partially reflect a3 and a4 (or one of them) without the need to transmit a1 and a2. The facets 266 in section 274 can have high reflectivity. Here too, it is possible to implement only section 270 with 272 or 272 with 274, i.e., to include internal distal facets without proximal internal facets, or the reverse.

Figure 24A:
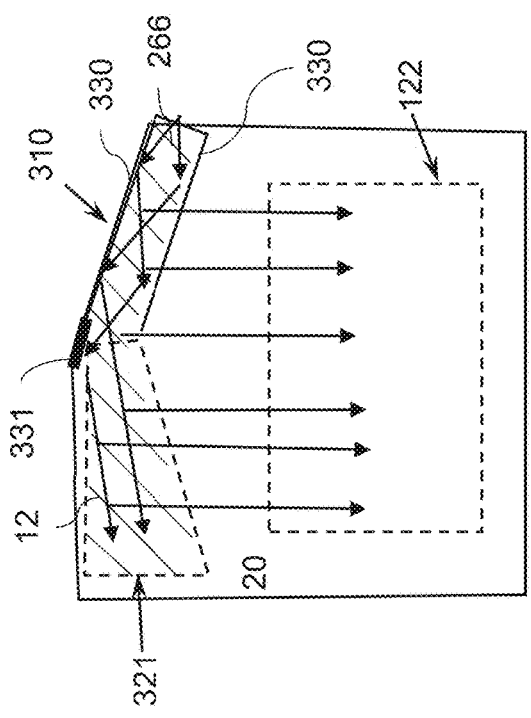
FIG. 24A is a schematic front view of an optical system for two-dimensional optical aperture expansion employing a rectangular light guide extending across a first part of a width of the light guide and where light emerges from an end of the rectangular light guide into a slab light guide.
Figure 24B:
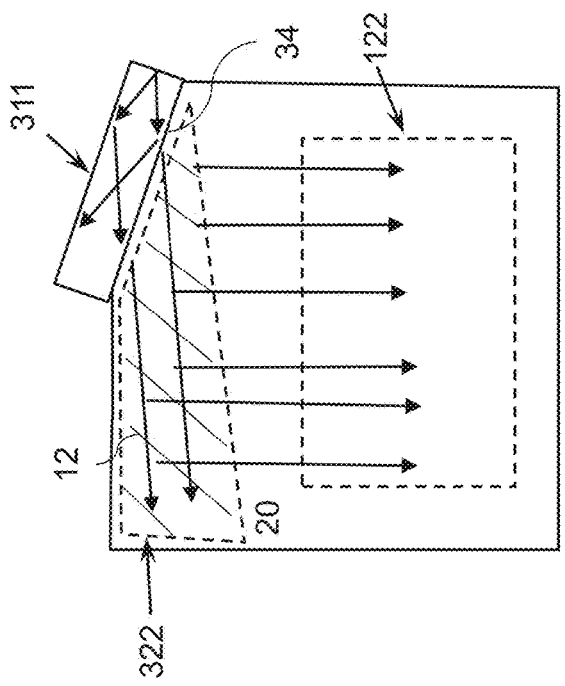
FIG. 24B is a schematic front view of an optical system for two-dimensional optical aperture expansion employing a PRLG similar to FIG. 2A.
Figure 24C:
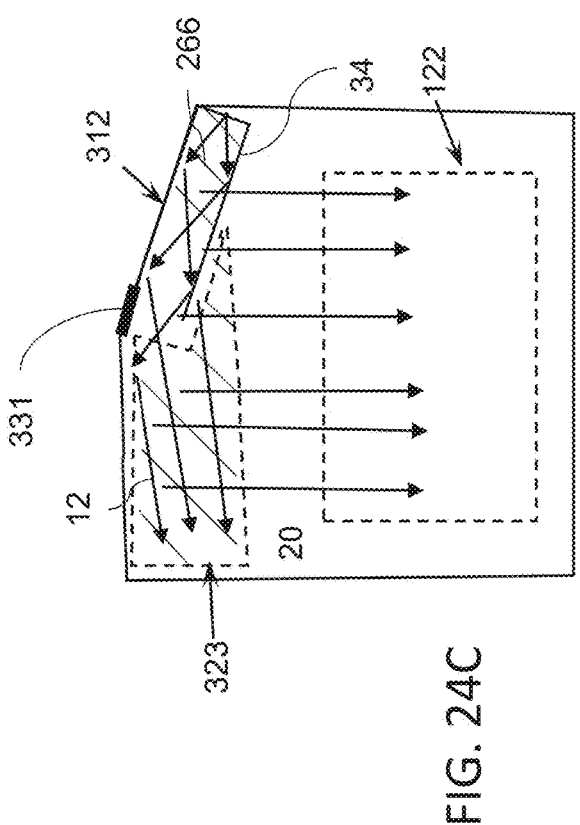
FIG. 24C is a schematic front view of an optical system for two-dimensional optical aperture expansion employing a combination of the features from FIGS. 24A and 24B.

Another group of configurations to perform lateral aperture expansion using a combination of a rectangular lightguide and facets lying outside the rectangular lightguide is shown in FIGS. 24A-24C.

In FIG. 24A, a rectangular light guide 310 includes facets that couple out beams into light guide 20 that includes a coupling-out configuration 122 that couples light beams out (typically embedded partially-reflecting facets, not shown for clarity). Rectangular light guide 310 here is bounded both above and below by TIR surfaces 330 (in contrast to the PRLG embodiments described above).

The end of rectangular light guide 310 opens onto a light guide section 321 so that the residual light beams emerge from rectangular light guide 310 to propagate through light guide section 321, directly or after an additional reflection on an extended parallel reflector 331 that is an extension of one of the faces 330 of the rectangular light guide. The beams emerging from rectangular light guide 310 into light guide section 321 are guided by two-fold internal reflection, but are no longer guided in a second dimension (up-down as illustrated), such that the light beams spread within the plane of light guide section 321. The beams are deflected by facets 266 within rectangular light guide 310 and by facets 12 in light guide section 321 to be guided in light guide 20 to the coupling-out configuration 122 and to the observer's eye.

In this configuration, the center of the lightguide is clear other than the coupling-out configuration, as preferred in augmented reality (AR) glasses. Furthermore, the fact that the rectangular light guide extends across only a part of the dimensions of the optical system reduces the number of four-fold reflections in the light paths, thereby rendering the system less susceptible to image degradation during propagation due to imperfections in the rectangular light guide.

FIG. 24B shows an alternative configuration in which beams in a PRLG 311 are coupled out through surface 34, in a manner fully analogous to the embodiments of FIGS. 2A and 9A. In this case, PRLG 311 is short and tilted, so that the beams emerging from it and into light guide 20 expand as they propagate through section 322. The facets 12 in expanding section 322 redirect the beams towards coupling-out configuration 122.

FIG. 24C shows a combination of features from the embodiments of FIGS. 24A and 24B, where partial-internal-reflection rectangular light guide 312 includes internal facets 266 along at least part of its length, but also features a partially-reflecting lower surface, allowing part of the propagating light intensity to escape and continue in its propagation direction into light guide section 323 which includes facets 12 positioned to deflect both light beams escaping through partially-reflecting surface 34 and those exiting the end of the PRLG 312.

Certain implementations of the present invention allow extension of a field of view of an output image beyond the limits of what could normally be conveyed by a rectangular light guide limited purely by TIR. Specifically, at least in the embodiments of FIGS. 2A-14 and 23B, the internal reflections from surface 34 are governed by the properties of the partially-reflecting coatings, and are not limited by TIR, and the other parallel surface 32 of the PRLG 10 can also be rendered reflective and angles beyond the limits of TIR by application of a reflective coating. This is illustrated in angular space in FIGS. 25 and 26.

Figure 26:
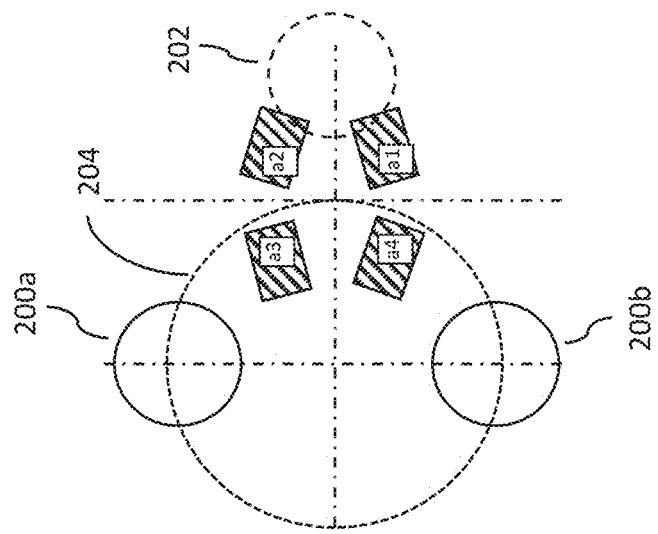
FIGS. 25 and 26 are schematic representations in angular notation corresponding to FIGS. 11A and 12A, respectively, illustrating images with enlarged angular dimensions which can be propagated through the systems by use of reflective coatings applied to the PRLG.
Figure 25:
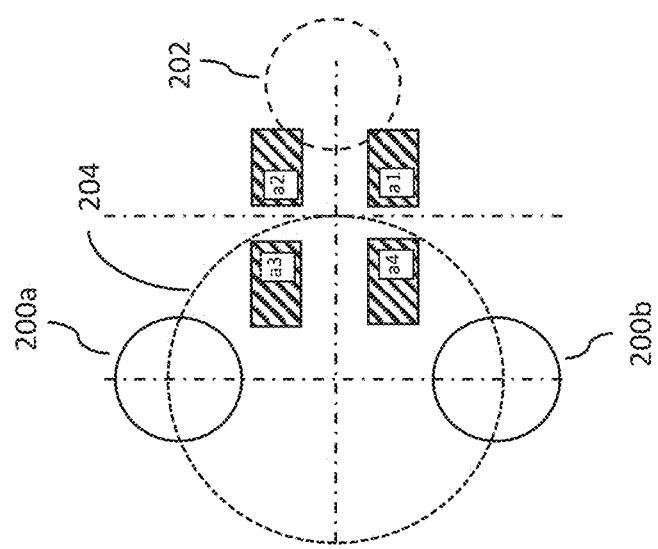

By way of introduction, in the angular representations of FIGS. 11A and 12A, the angular size of the projected image is limited by the TIR angles of the lightguide including, in particular, the TIR conditions represented by circle 202 for the top surface of PRLG 10). Thus, in FIGS. 11A and 12A, the width of the projected images is limited in angular size so that images a1 and a2 do not overlap circle 202, while the TIR limits of the front and back surfaces of the light guides 200a and 200b limit the vertical angular size of the images. FIGS. 25 and 26 illustrate how this limitation can be overcome to project a wider image field by coating the third major surface 32 of the PRLG 10 with a reflective coating to support reflection at incident angles below a critical angle of the transparent material in air.

FIG. 25 shows an optical architecture in angular space equivalent to that of FIG. 11A. By coating surface 32 (relevant to all configurations with rectangular lightguide) with a reflective coating (which may be a dielectric coating, silver, aluminum or other), the TIR limitation represented by circle 202 is no longer relevant (therefore marked as a dashed line for reference), and images a1 and a2 (thereby also their conjugates a3 and a4) can be wider so as to overlap circle 202 and yet still continue propagation in the lightguide. The reflection process for the remainder of the optical path, through reflection by facets 12 and the subsequent optical path, remain as described in FIGS. 11B and 11C, but with wider images.

FIG. 26 shows a correspondingly expanded image in an implementation similar to that of FIG. 12A, where a reflective coating is implemented on surface 32 in the case of obliquely-angled facets. Here too, a wider field can be achieved.

All the above descriptions refer to "lateral" and "vertical" as presented in the diagrams for clarity. Practically, these orientations can be different according to lightguide placement.

It will be appreciated that the above descriptions are intended only to serve as examples, and that many other embodiments are possible within the scope of the present invention as defined in the appended claims.

What is claimed is:

1. An optical system for directing light beams corresponding to an image from an image projector towards a user for viewing, the optical system comprising:
    (a) a partial-internal-reflection rectangular light guide (PRLG) formed from a transparent material and having first and second mutually-parallel major surfaces, a third major surface perpendicular to said first and second major surfaces, said first, second and third major surfaces supporting internal reflection for a range of incident angles, and a fourth major surface parallel to said third major surface, at least part of said fourth major surface provided with a non-diffractive, partially-reflecting coating;
    (b) a second light guide portion having a pair of mutually-parallel major surfaces for conveying the light beams by internal reflection, said second light guide portion optically coupled to at least part of an area of said partially-reflecting coating, said second light guide portion containing a set of planar, mutually-parallel, partially-reflecting surfaces located between, and non-parallel to, said pair of major surfaces;
    (c) a third light guide portion, formed as a continuation of, or adjacent to, said second light guide portion, said third light guide portion including a coupling-out configuration deployed for coupling-out the light beams propagating within the third light guide portion by internal reflection so as to direct the light beams towards the user; and
    (d) a coupling-in arrangement for coupling light beams corresponding to a collimated image from the image projector into said PRLG so as to propagate within said PRLG by four-fold internal reflection at said first, second, third and fourth major surfaces,
    such that the light beams from the image projector propagating by four-fold internal reflection within said PRLG are progressively emitted from said PRLG through said partially-reflecting coating and enter said second light guide portion, are redirected by reflection at said set of partially-reflecting surfaces so as to propagate within said third light guide portion, and are coupled-out from said third light guide portion by said coupling-out configuration towards the user.

2. The optical system of claim 1, wherein said PRLG has a length along a direction parallel to a line of intersection between said first major surface and said third major surface, and wherein a maximum length of a light path of the light beams from being emitted from said PRLG until being redirected by one of said set of partially-reflecting surfaces is longer than said length of said PRLG.

3. The optical system of claim 1, wherein said PRLG has a length along a direction parallel to a line of intersection between said first major surface and said third major surface, and wherein a maximum length of a light path of the light beams from being emitted from said PRLG until being redirected by one of said set of partially-reflecting surfaces is shorter than said length of said PRLG.

4. The optical system of claim 1, wherein said second light guide portion has a second pair of mutually-parallel major surfaces, perpendicular to said pair of mutually-parallel major surfaces, so that said second light guide portion conveys the light beams by four-fold internal reflection, said set of partially-reflecting surfaces coupling said light beams out from said second light guide portion and into said third light guide portion.

5. The optical system of claim 1, wherein said first and second major surfaces of said PRLG are parallel to, or coplanar with, said pair of mutually-parallel major surfaces of said second light guide portion.

6. The optical system of claim 1, wherein said second light guide portion and said third light guide portion are portions of a single light guide such that said pair of mutually-parallel major surfaces extend continuously across said second and third light guide portions.

7. The optical system of claim 1, wherein said coupling-out configuration comprises a second set of mutually-parallel partially-reflecting internal surfaces deployed within said third light guide portion.

8. The optical system of claim 1, wherein said coupling-out configuration comprises a diffractive optical element associated with said third light guide portion.

9. The optical system of claim 1, wherein said PRLG is without internal reflectors.

10. The optical system of claim 1, wherein a majority of a length of said PRLG is free from internal reflectors.

11. The optical system of claim 1, wherein said PRLG includes at least one partially-reflecting internal surface, parallel to said set of partially-reflecting surfaces of said second light guide portion.

12. The optical system of claim 11, wherein said at least one partially-reflecting internal surface includes a surface having a reflectivity for at least one range of incident angles that is greater than 10%, said surface being located in a third of a length of said PRLG distal to said coupling-in arrangement.

13. The optical system of claim 11, wherein said at least one partially-reflecting internal surface includes a surface having a reflectivity for at least one range of incident angles that is less than 10%, said surface being located in a third of a length of said PRLG proximal to said coupling-in arrangement.

14. The optical system of claim 1, wherein said third major surface of said PRLG is coated with a reflective coating to support reflection at incident angles below a critical angle of the transparent material in air.

15. An optical system for directing light beams corresponding to an image from an image projector towards a user for viewing, the optical system comprising:
   (a) a partial-internal-reflection rectangular light guide (PRLG) formed from a transparent material and having first and second mutually-parallel major surfaces, a third major surface perpendicular to said first and second major surfaces, said first, second and third major surfaces supporting internal reflection for a range of incident angles, and a fourth major surface parallel to said third major surface, at least part of said fourth major surface provided with a non-diffractive, partially-reflecting coating;
   (b) a second light guide portion having a pair of mutually-parallel major surfaces for conveying the light beams by internal reflection, said second light guide portion optically coupled to at least part of an area of said partially-reflecting coating, said second light guide portion being provided with a diffractive optical element deployed to deflect light beams propagating within said second light guide portion;
   (c) a third light guide portion, formed as a continuation of, or adjacent to, said second light guide portion, said third light guide portion including a coupling-out configuration deployed for coupling-out the light beams propagating within the third light guide portion by internal reflection so as to direct the light beams towards the user; and
   (d) a coupling-in arrangement for coupling light beams corresponding to a collimated image from the image projector into said PRLG so as to propagate within said PRLG by four-fold internal reflection at said first, second, third and fourth major surfaces, such that the light beams from the image projector propagating by four-fold internal reflection within said PRLG are progressively emitted from said PRLG through said partially-reflecting coating and enter said second light guide portion, are redirected by said diffractive optical element so as to propagate within said third light guide portion, and are coupled-out from said third light guide portion by said coupling-out configuration towards the user.

16. An optical system for directing light beams corresponding to an image from an image projector towards a user for viewing, the optical system comprising:
   (a) a partial-internal-reflection rectangular light-guide (PRLG) formed from a transparent material and having first and second mutually-parallel major surfaces and a third major surface perpendicular to said first and second major surfaces, said first, second and third major surfaces supporting internal reflection for incident angles above a critical angle, at least said third major surface being transmissive for incident angles smaller than the critical angle, and a fourth major surface parallel to said third major surface, at least part of said fourth major surface provided with a partially-reflecting coating that is partially reflecting for angles of incidence greater than the critical angle and transparent for said incident angles smaller than the critical angle;
   (b) a second light guide having a pair of mutually-parallel major surfaces for conveying the light beams by internal reflection, said second light guide optically coupled to at least part of an area of said partially-reflecting coating of said fourth major surface, said second light guide containing a set of planar, mutually-parallel, partially-reflecting surfaces located between, and non-parallel to, said pair of major surfaces;
   (c) a third light guide adjacent to said third major surface, said third light guide including a coupling-out configuration deployed for coupling-out the light beams propagating within the third light guide by internal reflection so as to direct the light beams towards the user; and
   (d) a coupling-in arrangement for coupling light beams corresponding to a collimated image from the image projector into said PRLG so as to propagate within said PRLG by four-fold internal reflection at said first, second, third and fourth major surfaces, such that the light beams from the image projector propagating by four-fold internal reflection within said PRLG are incident on said fourth major surface at incident angles greater than the critical angle, are progressively emitted from said PRLG through said partially-reflecting coating and enter said second light guide, are redirected by reflection at said set of partially-reflecting surfaces so as to be incident on said fourth major surface at incident angles less than the critical angle, traverse said PRLG and pass through said third major surface to enter said third light guide, propagating within said third light guide by internal reflection and being coupled-out from said third light guide by said coupling-out configuration towards the user.

17. The optical system of claim 16, wherein said pair of major surfaces of said second light guide are perpendicular to said fourth major surface of said PRLG.

18. The optical system of claim 17, wherein said second light guide further comprises an additional major surface parallel to said fourth major surface, said additional major surface supporting internal reflection of said light beams at incident angles greater than the critical angle.

* * * * *